(12) United States Patent
Miwa

(10) Patent No.: US 7,545,417 B2
(45) Date of Patent: Jun. 9, 2009

(54) IMAGE PROCESSING APPARATUS, IMAGE PROCESSING METHOD, AND IMAGE PROCESSING PROGRAM

(75) Inventor: Yoko Miwa, Tokyo (JP)

(73) Assignee: Sony Corporation, Tokyo (JP)

( * ) Notice: Subject to any disclaimer, the term of this patent is extended or adjusted under 35 U.S.C. 154(b) by 595 days.

(21) Appl. No.: 11/431,595

(22) Filed: May 11, 2006

(65) Prior Publication Data

US 2006/0268128 A1    Nov. 30, 2006

(30) Foreign Application Priority Data

May 30, 2005    (JP)    ............................. 2005-157588

(51) Int. Cl.
  *H04N 9/68*    (2006.01)
  *H04N 5/225*   (2006.01)
  *H04N 5/228*   (2006.01)
(52) U.S. Cl. .................... 348/234; 348/169; 348/222.1
(58) Field of Classification Search ................ 348/234, 348/169
  See application file for complete search history.

(56) References Cited

U.S. PATENT DOCUMENTS

| 5,196,929 | A  | * | 3/1993 | Miyasaka ................... 348/169 |
| 6,088,468 | A  | * | 7/2000 | Ito et al. ..................... 382/103 |
| 6,859,546 | B2 | * | 2/2005 | Matsukawa et al. ......... 382/103 |
| 6,870,566 | B1 | * | 3/2005 | Koide et al. ................. 348/296 |
| 7,345,702 | B2 | * | 3/2008 | Kawahara .................... 348/234 |
| 2003/0099407 | A1 | * | 5/2003 | Matsushima ................ 382/274 |
| 2005/0012831 | A1 | * | 1/2005 | Yano .......................... 348/234 |

\* cited by examiner

*Primary Examiner*—Nhan T Tran
*Assistant Examiner*—Amy Hsu
(74) *Attorney, Agent, or Firm*—Oblon, Spivak, McClelland, Maier & Neustadt, P.C.

(57) ABSTRACT

An image processing apparatus includes an image capturing unit configured to capture temporally sequential images; a calculating unit configured to calculate weights of a plurality of luminance distributions; a classifying unit configured to classify a temporal change state of the luminance of one or a plurality of pixels into a plurality of classes; a class transition determining unit configured to determine temporal transition of the luminance change state; a reference luminance value updating unit configured to update a reference luminance value of the one or the plurality of pixels; a change-of-luminance detecting unit configured to detect whether the luminance of the one or the plurality of pixels has changed; and a detected change storing unit configured to store information to identify a position of the one or the plurality of pixels in the image where a change has occurred and information about the time when the change occurred.

9 Claims, 18 Drawing Sheets

FIG. 17

$$B_t = (1-\alpha)C_t + \alpha B_{t-1} \quad \cdots (1)$$

$$P(X_t) = \sum_{i=1}^{k} w_{i,t} \times \eta(X_t, \mu_{i,t}, \Sigma_{i,t}) \quad \cdots (2)$$

where in k : the number of normal distributions
$w_{i,t}$ : weight of i-th normal distribution at time t
$\mu_{i,t}$ : mean of i-th normal distribution at time t
$\Sigma_{i,t}$ : covariance of i-th normal distribution at time t
and $\eta$ : probability density function $$\eta(X_t, \mu, \Sigma) = \frac{1}{(2\pi)^{\frac{n}{2}}|\Sigma|^{\frac{1}{2}}} e^{-\frac{1}{2}(X_t-\mu_t)^T \Sigma^{-1}(X_t-\mu_t)} \quad \cdots (3)$$

wherein covariance matrix $\Sigma_{k,t}$ is $$\Sigma_{k,t} = \sigma_k^2 I \quad \cdots (4)$$

$$w_{k,t} = (1-\alpha)w_{k,t-1} + \alpha \quad \cdots (5)$$

$$w_{k,t} = (1-\alpha)w_{k,t-1} \quad \cdots (6)$$

$$\mu_t = (1-\rho)\mu_{t-1} + \rho X_t \quad \cdots (7)$$

$$\sigma^2 = (1-\rho)\sigma_{t-1}^2 + \rho(X_t-\mu_t)^T(X_t-\mu_t) \quad \cdots (8)$$

$$\rho = \alpha \eta(X_t | \mu_k, \sigma_k) \quad \cdots (9)$$

IMAGE PROCESSING APPARATUS, IMAGE PROCESSING METHOD, AND IMAGE PROCESSING PROGRAM

CROSS REFERENCES TO RELATED APPLICATIONS

The present invention contains subject matter related to Japanese Patent Application JP 2005-157588 filed in the Japanese Patent Office on May 30, 2005, the entire contents of which are incorporated herein by reference.

BACKGROUND OF THE INVENTION

1. Field of the Invention

The present invention relates to an image processing apparatus, an image processing method, and an image processing program to detect an object (an image portion) that has appeared in an image and stopped there or that has disappeared from the image with the elapse of time.

2. Description of the Related Art

There has conventionally been suggested an image processing apparatus to detect an object that has appeared in a monitored area and stopped there or that has disappeared from the monitored area (hereinafter referred to as an unmoving object), by image processing based on video data obtained through a camera.

For example, Patent Document 1 (Japanese Patent No. 2913882) suggests a method and apparatus of detecting an obstacle or a dropped object on a road. In this known art, appearance and disappearance of an object on a road are determined and detected on the basis of changes of a plus/minus sign of a difference between a sequentially-updated reference background image and a captured image.

Various methods can be used to update a reference background image, one of them being exponential smoothing. In the exponential smoothing, a background image $B_t$ is updated in the manner indicated by expression (1) shown in FIG. 17. Herein, the background image $B_t$ is obtained at time t, an input image is $C_t$, and a smoothing constant is $\alpha$ ($0 \leq \alpha \leq 1$).

In the exponential smoothing, an effect of an input image can be mitigated by increasing the smoothing constant $\alpha$. Also, the effect can be mitigated when a moving object exists in the input image. However, the effect becomes significant if many moving objects exist in the input image.

In order to overcome this problem, a weighted mixture of normal distributions can be used to update a reference background image. In the method using a weighted mixture of normal distributions, a temporal change in luminance of each pixel is detected. The details are described below.

A probability $P(X_t)$ of a luminance $X_t$ of a present (time t) pixel can be typically expressed by expression (2) shown in FIG. 17. A probability density function $\eta$ in expression (2) can be expressed by expression (3) shown in FIG. 17. At this time, a covariance matrix $\Sigma_{k,t}$ is assumed to be expressed by expression (4) shown in FIG. 17.

In the method using a weighted mixture of normal distributions, whether the luminance of each pixel belongs to any of k (k is a positive integer) normal distributions is determined. For example, when luminance data of each pixel is 8-bit image data, four luminance normal distributions shown in FIG. 18A are provided, and whether the luminance of each pixel belongs to which of the four luminance normal distributions is determined.

For example, whether a luminance $X_t$ of a pixel is within the range of a mean value $\mu_k \pm 2\sigma_k$ of the luminance normal distribution is determined. If the luminance $X_t$ is within the range, the luminance $X_t$ is determined to belong to the luminance normal distribution. Otherwise, the luminance $X_t$ is determined not to belong to the luminance normal distribution. If the luminance $X_t$ does not belong to any of the luminance normal distributions, a mean value $\mu$ of the luminance normal distribution of the smallest weight (described below) among the k luminance normal distributions is replaced by the luminance $X_t$ of the pixel at that time.

Then, the weights $\omega_{k,t}$ of the respective luminance normal distributions are updated for each pixel so that the weight of the luminance normal distribution to which the luminance $X_t$ of the pixel belong becomes large and the weights of the other luminance normal distributions become small. More specifically, the weight $\omega_{k,t}$ of the luminance normal distribution to which the luminance $X_t$ of the pixel belong is updated in accordance with expression (5) shown in FIG. 17, whereas the weights $\omega_{k,t}$ of the other luminance normal distributions are updated in accordance with expression (6) shown in FIG. 17. In expressions (5) and (6), $\alpha$ is a speed of updating the weight ($0 \leq \alpha \leq 1$).

The mean values $\mu_t$ and the variances $\sigma$ of the respective luminance normal distributions are updated based on expressions (7), (8), and (9) shown in FIG. 17.

In this way, information about the respective weights $\omega_{k,t}$ of the plurality of luminance normal distributions is updated for each pixel, as shown in FIG. 18B. The mean value of the luminance normal distribution of the largest weight obtained in this method basically indicates the luminance of a pixel in a still image portion except a moving object.

Therefore, by monitoring a change in the mean value of a luminance normal distribution of the largest weight, a state where an object has moved and disappeared and a state where an object has appeared and stopped can be detected in units of pixels without being affected by a moving object. Further, by positionally combining detection results of the respective pixels, an unmoving object can be detected as a block of an image portion.

SUMMARY OF THE INVENTION

In the above-described method for updating a background image by using a weighted mixture of normal distributions, if an unmoving object is to be detected by monitoring a change in the mean value of the luminance normal distribution of the largest weight and if a luminance frequently changes, e.g., in shaking of trees by wind or ruffle on a water surface, the frequent change of the luminance causes a wrong detection in which an unmoving object is frequently detected.

This problem is further discussed below while referring to changes in weights of the two normal distributions having upper two weights among a plurality of luminance normal distributions.

For example, assume that a car enters an area monitored by a camera and stops there. In this case, when the luminance of a pixel in an image area where the car has stopped is monitored in a time direction, the luminance of the pixel changes from that a background to that of the car. Under such condition, FIG. 19 shows changes in the upper two weights of the above-described weighted mixture of normal distributions.

In FIG. 19, f1(w1_t, m1_t) represents a background having a weight w1_t and a luminance (mean value of the luminance normal distribution) m1_t in time t, whereas f2(w2_t, m2_t) represents a car having a weight w2_t and a luminance (mean value of the luminance normal distribution) m2_t in time t. Both the weight and the luminance (mean value of the luminance normal distribution) are updated in accordance with expressions (5), (6), and (7) with elapse of time t.

As shown in FIG. 19, the weight w1_t of the background is the largest at first, the weight w2_t of the car gradually increases after the car has stopped, the weight w1_t of the background decreases accordingly, and eventually the weight w2_t of the car becomes the largest. Therefore, it can be recognized that a target pixel has changed from the background to the stopped car by detecting a change of the mean value (luminance) of the luminance normal distribution of the largest weight, that is, by detecting the difference between m1_t and m2_t shown in FIG. 19.

FIG. 20 shows changes in weights of the luminance normal distributions having upper two weights in the case where a car passes through a monitored area. As in FIG. 19, f1(w1_t, m1_t) represents a background and f2(w2_t, m2_t) represents a car.

As shown in FIG. 20, the weight of the car increases and the weight of the background decreases in a target pixel while the car is passing through the monitored area. However, after the car has passed and the target pixel has returned to the background, the weight thereof recovers immediately. In this case, the distribution of the largest weight does not change as long as the speed of the car is not low, so that the luminance of the target pixel does not change.

In this way, by monitoring a change in the mean value of the luminance normal distribution of the largest weight (luminance value of a pixel), a state where an object has moved and disappeared and a state where an object has moved and stopped can be detected in a monitored area without being affected by a moving object.

However, if the luminance frequently changes at regular intervals, e.g., in shaking of trees or ruffle on a water surface, the weights of the luminance normal distributions of the upper two weights change in the manner shown in FIG. 21, that is, the largest weight constantly changes hands between the two weights, which causes a wrong detection.

The present invention has been made in view of these circumstances and is directed to provide an image processing apparatus and an image processing method capable of detecting an unmoving object while preventing the above-described wrong detection.

An image processing apparatus according to an embodiment of the present invention includes an image capturing unit configured to capture temporally sequential images; a calculating unit configured to calculate weights of a plurality of luminance distributions by determining, in units of one or a plurality of pixels of the image captured by the image capturing unit, whether the luminance of the one or the plurality of pixels belongs to any of the plurality of luminance distributions and by gradually increasing the weight of the luminance distribution to which the luminance belongs and gradually decreasing the weights of the other luminance distributions; a classifying unit configured to classify a temporal change state of the luminance of the one or the plurality of pixels into a plurality of classes on the basis of the weights of the luminance distributions calculated by the calculating unit, the plurality of classes including at least a stable class in which the luminance of the one or the plurality of pixels is stable within a predetermined range, an unstable class in which the luminance distribution to which the luminance of the one or the plurality of pixels belongs is difficult to be determined, and an intermediate class between the stable class and the unstable class; a class transition determining unit configured to determine temporal transition of the luminance change state classified by the classifying unit in units of the one or the plurality of pixels; a reference luminance value updating unit configured to update a reference luminance value of the one or the plurality of pixels in accordance with elapse of time by obtaining a representative luminance value of the luminance distribution having the largest weight when a temporal change state of the luminance of the one or the plurality of pixels belongs to the stable class; a change-of-luminance detecting unit configured to detect whether the luminance of the one or the plurality of pixels has changed by comparing the reference luminance value with a representative luminance value of the luminance distribution having the largest weight among the plurality of luminance distributions at a change-of-luminance detection timing, the change-of-luminance detection timing being a time point when the class changes to the stable class from the unstable class through the intermediate class in the temporal transition determined by the class transition determining unit; and a detected change storing unit configured to store information to identify a position of the one or the plurality of pixels in the image where a change has occurred and information about the time when the change occurred when the change-of-luminance detecting unit detects a change of the luminance. An image portion that has appeared in the image and stopped there or that has disappeared from the image with elapse of time is detected on the basis of the information stored in the detected change storing unit.

The calculating unit calculates the respective weights of the plurality of luminance distributions in units of one or a plurality of pixels. The classifying unit performs classification into the plurality of classes including at least the stable class, the intermediate class, and the unstable class on the basis of the weights of the luminance distributions calculated by the calculating unit.

The class transition determining unit determines temporal transition of the state classified by the classifying unit, and sets a time point when the class changes to the stable class from the unstable class through the intermediate class as a change-of-luminance detection timing.

At the change-of-luminance detection timing, the change-of-luminance detecting unit compares a representative luminance value of the luminance distribution having the largest weight among the plurality of luminance distributions with a reference luminance value, which is a representative luminance value of the luminance distribution having the largest weight when the temporal change state of the luminance of the one or the plurality of pixels belongs to the stable class, so as to detect whether the luminance of the one or the plurality of pixels has changed.

The detected change storing unit stores information to identify a position of the one or the plurality of pixels in the image where a change has occurred and information about the time when the change occurred when the change-of-luminance detecting unit detects a change of the luminance. On the basis of the stored information, an image portion that has appeared in the image and stopped there or that has disappeared from the image with elapse of time is detected.

According to the embodiment of the present invention, instead of simply focusing an attention on a change of a mean value of the luminance distribution of the largest weight, a change in luminance occurred when the class changes to the stable class from the unstable class through the intermediate class is detected. Therefore, when the luminance constantly changes as in shaking of trees or ruffle on a water surface, the change is not detected as a change in the luminance of an unmoving object, so that a wrong detection can be prevented.

According to the embodiment of the present invention, an unmoving object in an image can be detected without wrongly detecting a change in luminance when the luminance constantly changes, for example, in shaking of trees or ruffle on a water surface.

BRIEF DESCRIPTION OF THE DRAWINGS

FIG. 17 is used to describe a weighted mixture of normal distributions used in the image processing method;

DESCRIPTION OF THE PREFERRED EMBODIMENTS

Hereinafter, an image processing apparatus and an image processing method according to an embodiment of the present invention are described with reference to the drawings.

In the image processing apparatus and image processing method according to the embodiment described below, an unmoving object is detected from an image of a monitored area shot by a monitoring camera by updating a background image using the above-described weighted mixture of normal distributions. Therefore, in this embodiment, a representative luminance value of a luminance distribution is a mean value of the luminance in the distribution.

Figure 2:
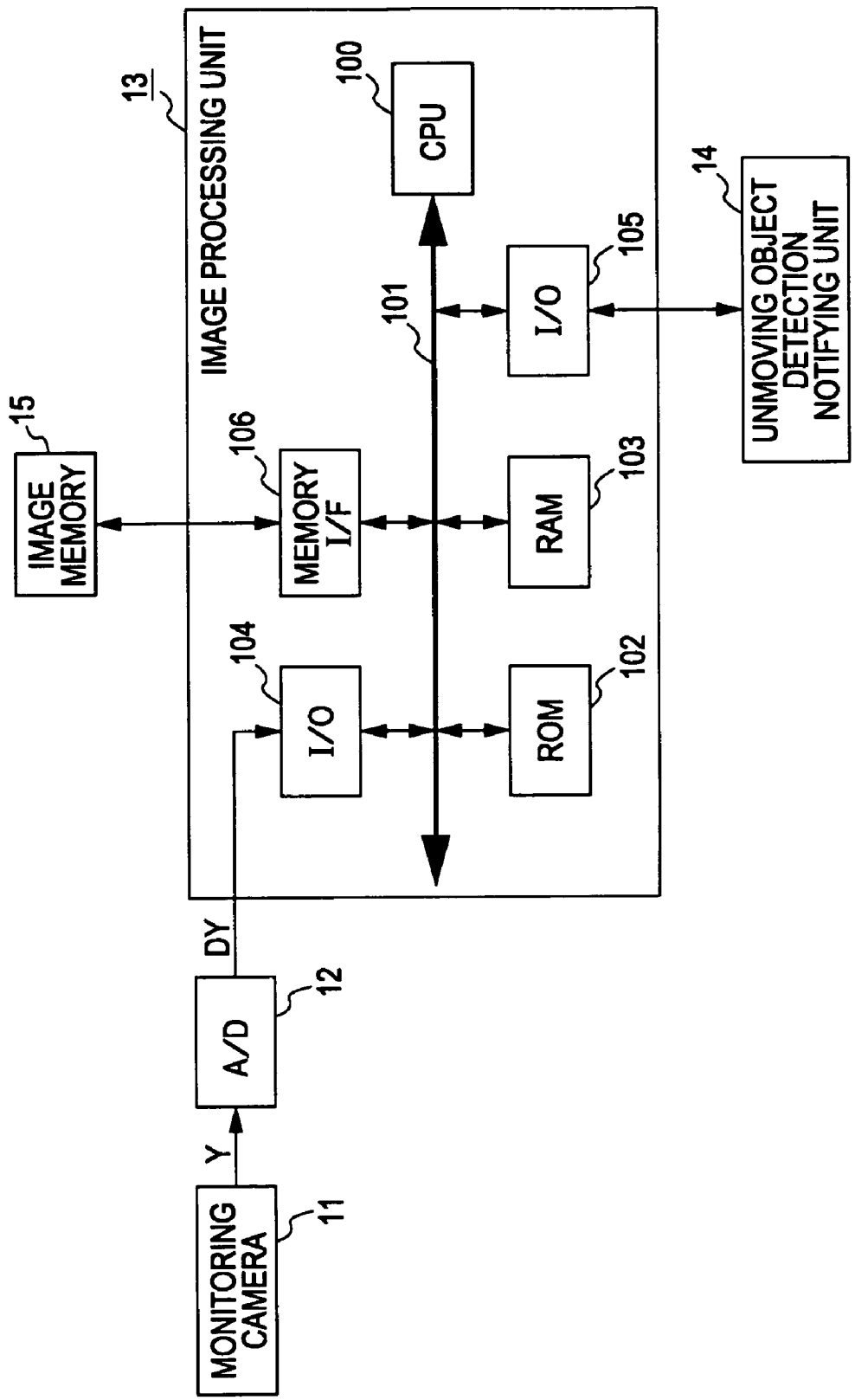
FIG. 2 is a block diagram showing an example of a configuration of a monitoring system using the image processing apparatus according to the embodiment of the present invention.

FIG. 2 is a block diagram showing an example of a configuration of a monitoring camera system including the image processing apparatus according to the embodiment. This system constitutes an apparatus to detect an unmoving object in a monitored area.

In FIG. 2, a monitoring camera 11 is set at a position appropriate for shooting a monitored area. Luminance information Y of an image of a monitored area shot by the monitoring camera 11 is supplied to an A/D converter 12, where the luminance information Y is converted to a digital image signal DY in which each pixel is composed of data of three-primary-color (RGB) signals. The digital image signal DY is supplied to an image processing unit 13, which corresponds to the image processing apparatus according to the embodiment.

The image processing unit 13 includes a computer in this embodiment. More specifically, the image processing unit 13 includes a CPU (central processing unit) 100 connecting through a system bus 101 to a program ROM (read only memory) 102, a RAM (random access memory) 103 serving as a work area, I/O (input/output) ports 104 and 105, and a memory interface 106.

The digital image signal DY from the A/D converter 12 is input to the system bus 101 through the I/O port 104. An unmoving object detection result output from the image processing unit 13 is supplied to an unmoving object detection notifying unit 14 through the I/O port 105. The unmoving object detection notifying unit 14 notifies a user that an unmoving object has been detected by outputting an alarm or displaying a message on a display unit if the result output from the image processing unit 13 indicates that an unmoving object has been detected.

The memory interface 106 connects to an image memory 15. The image memory 15 temporarily stores image data that is generated during image processing to detect an unmoving object (described below) performed by the image processing unit 13.

The ROM 102 stores a program to execute the image processing to detect an unmoving object described below. The CPU 100 executes the image processing in accordance with this program by using the RAM 103 as a work area.

The image processing method to detect an unmoving object according to this embodiment is basically the same as the above-described known method. That is, a background image is updated by calculating a weighted mixture of normal distributions, and a change in luminance as a mean value of the luminance normal distribution of the largest weight is detected, whereby an unmoving object is detected. However, the method according to this embodiment is different from the known art in the following points.

In this embodiment, a change in luminance is not detected every time the luminance normal distribution of the largest weight changes, but is detected only when the luminance of a background image is reliably expected to be changed.

In this embodiment, a temporal change state of a luminance of each pixel is classified into a plurality of classes including at least (1) a stable class in which the luminance of the pixel is stable within a predetermined range; (2) an unstable class in which whether the luminance of the pixel belongs to which of the luminance normal distributions is difficult to be determined; and (3) an intermediate class between the stable class and the unstable class, on the basis of the weights of the luminance normal distributions calculated by a weighted mixture of normal distributions calculating unit. In this example, a temporal change state of luminance is classified into any of the stable class, the intermediate class, and the unstable class.

Then, a temporal transition in the classes is determined. When the class changes to the stable class from the unstable class through the intermediate class, an appropriate point in the stable class is determined to be a change-of-luminance detection timing. At the change-of-luminance detection timing, a mean luminance value as a representative luminance value of the luminance normal distribution of the largest weight among a plurality of luminance normal distributions is compared with a reference luminance value which is the luminance of the pixel. Accordingly, whether the luminance of the pixel has changed is detected. Then, detection of an unmoving object is performed on the basis of the detection result about the change in luminance.

Various methods can be used as a classifying method, for example, classification may be performed on the basis of the relationship among weights of a plurality of distributions. In this embodiment, classification is performed on the basis of the relationship between the weights of two luminance normal distributions having upper two weights, particularly, the ratio between the upper two weights. In this embodiment, classification is performed on the basis of the value of a ratio "r" expressed by the following expression: ratio $r=wb/ws$ ... expression (10), in which "wb" is the larger weight of the upper two weights and "ws" is the smaller weight.

In this case, when the ratio r is 1 or approximately 1, whether the luminance of the pixel belongs to which of the upper two luminance normal distributions is difficult to be determined, so that the temporal change state of the luminance belongs to the unstable class.

When the ratio r is a predetermined value or larger, a significant difference exists between the weights of the upper two luminance normal distributions. Therefore, whether the luminance of the pixel belongs to which of the luminance normal distributions can be stably determined, so that the temporal change state of the luminance belongs to the stable class. An intermediate state between the stable class and the unstable class is the intermediate class.

Thresholds used for each classification to the ratio r are determined through trial and error. In this example, Unstable class: $1 \leq r < 1.1\text{-}1.2$;
Intermediate class: $1.1\text{-}1.2 \leq r < 1.5$; and
Stable class: $1.5 \leq r$ ... expression (11).

Figure 3:
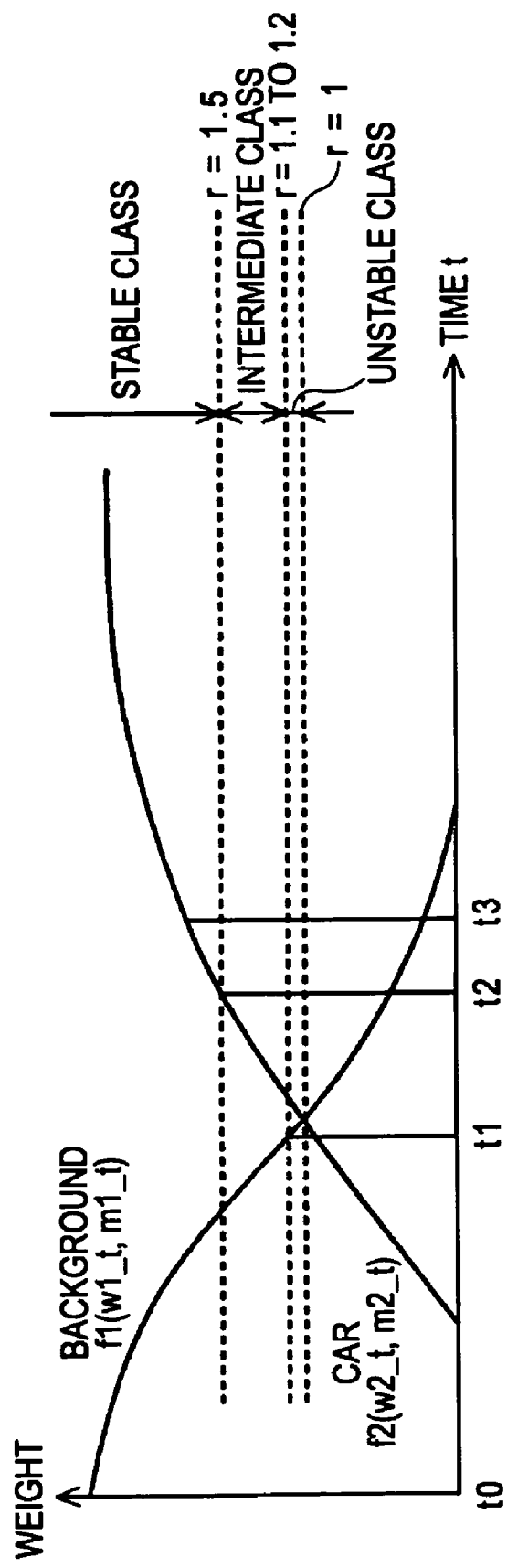
FIG. 3 illustrates a main part of an image processing method according to an embodiment of the present invention.
Figure 19:
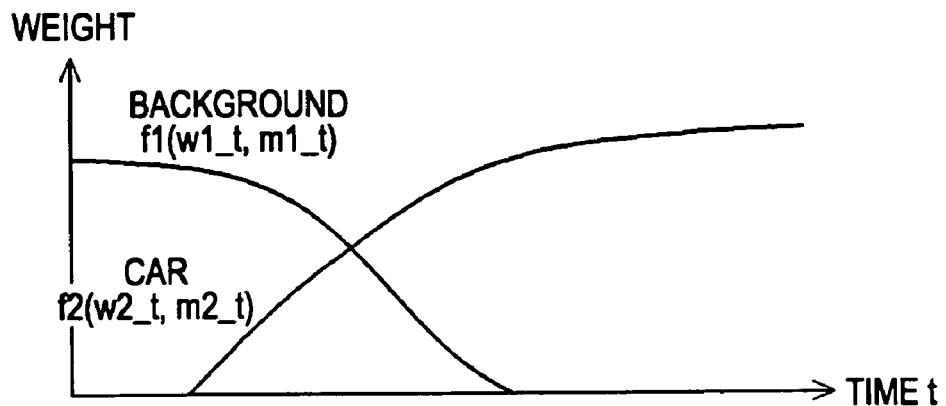
FIG. 19 is used to describe the weighted mixture of normal distributions used in the image processing method.

Related to changes of the upper two weights in the above-described case shown in FIG. 19 where a car has entered a monitored area and stopped there, FIG. 3 shows the three classes. In this embodiment, when the larger weight changes hands between the upper two weights and when the temporal change state of the luminance changes in the following order: the unstable class, the intermediate class, and then the stable class, an appropriate point in the stable class is regarded as a change-of-luminance detection timing.

In the example shown in FIG. 3, time t3 that comes after a predetermined time period has elapsed after time t2, when the class changes to the stable class from the unstable class through the intermediate class, is regarded as a change-of-luminance detection timing. Time t3, not time t2, is regarded as the change-of-luminance detection timing so that an object whose luminance returns to the intermediate class soon after it has changed to the stable class is not detected.

Then, at the change-of-luminance detection timing, a mean luminance value as a representative luminance value of the luminance normal distribution of the largest weight among a plurality of luminance normal distributions is detected as a luminance value of the pixel in the stable class, that is, as a luminance value of the pixel after change.

Then, the detected luminance value (hereinafter referred to as a post-change luminance value) is compared with the luminance value before change (hereinafter referred to as a reference luminance value). If a significant difference exists between the two luminance values, that is, if the post-change luminance value and the reference luminance value belong to different luminance normal distributions, it is determined that the pixel has changed from a background to another object (unmoving object).

Figure 4:
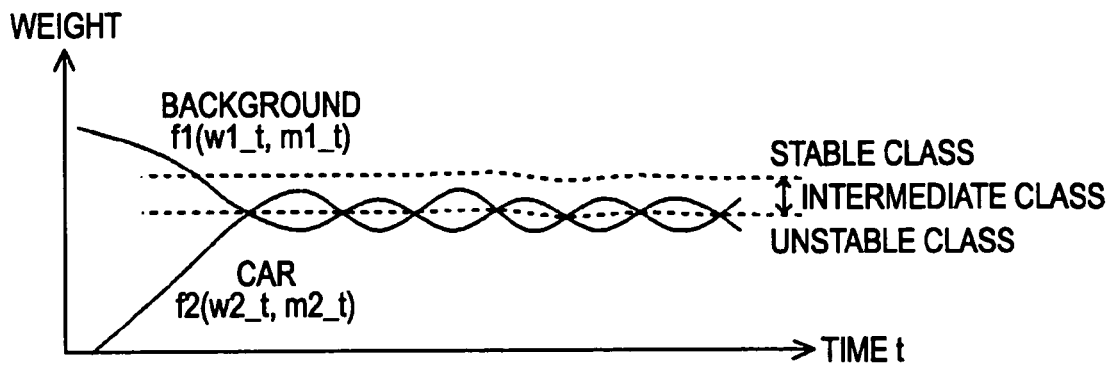
FIG. 4 illustrates a main part of the image processing method according to the embodiment of the present invention.
Figure 20:
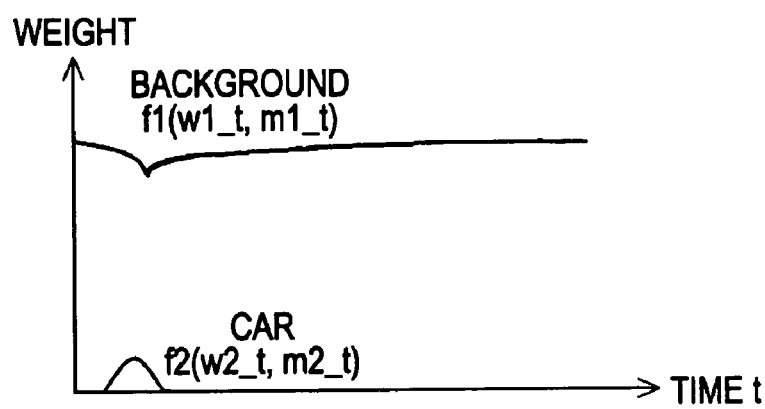
FIG. 20 is used to describe the weighted mixture of normal distributions used in the image processing method.
Figure 21:
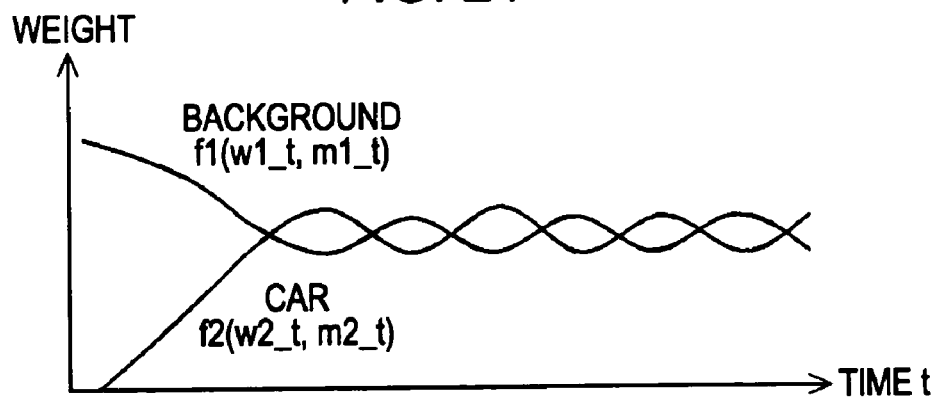
FIG. 21 is used to describe the weighted mixture of normal distributions used in the image processing method.

According to the method for detecting an unmoving object of this embodiment, changes of the upper two weights in the case where the luminance frequently changes, as in shaking of trees or ruffle on a water surface shown in FIG. 20, cause changes between the unstable class and the intermediate class as shown in FIG. 4. In this case, a change-of-luminance detection timing does not occur, so that a wrong detection can be prevented.

Herein, the post-change luminance value obtained at time t3 shown in FIG. 3 may be used as the reference luminance value. In that case, however, the reference luminance value becomes old if the stable class continues for a long time.

If the luminance value obtained at time t3 is constantly used as a reference luminance value, even an object that moves after a short stay (stop) is detected as an unmoving object. The occurrence of a change-of-luminance detection timing at time t3 should be prevented in a case similar to the above-described shaking of trees or ruffle on a water surface.

Figure 5:
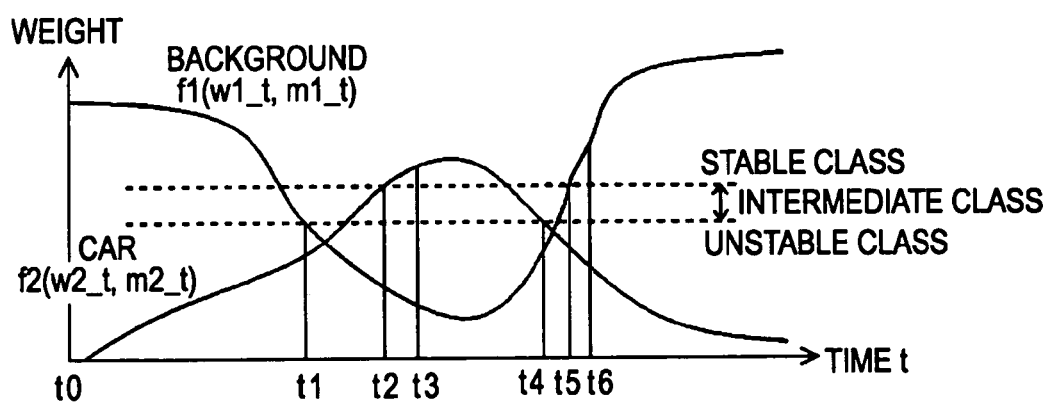
FIG. 5 illustrates a main part of the image processing method according to the embodiment of the present invention.

That is, if the reference luminance value is updated to the post-change luminance value obtained at the change-of-luminance detection timing and if an object stays for a short time, the temporal change state of the luminance thereof belonging to the stable class for short time and then changes to the unstable class as shown in FIG. 5, the luminance of a background where the object has disappeared is compared with the luminance of the object at the next change-of-luminance detection timing, so that the object is detected as an unmoving object. In other words, in the example shown in FIG. 5, time t3 and time t6 are change-of-luminance detection timings. However, since the distribution having the largest weight is different at time t3 and time t6, an unmoving object is detected at time t6.

In this embodiment, a change-of-luminance detection timing to obtain a post-change luminance value is different from a timing to update a reference luminance value. When an object stays only for a short time, the reference luminance value is not updated. That is, the luminance value of the object staying for a short time is not reflected on the reference luminance value and the reference luminance value is kept at the value of the background before the object enters. Accordingly, the object staying for a short time is not detected as an unmoving object.

Furthermore, in this embodiment, a luminance value of a target pixel just before the luminance changes is obtained as a reference luminance value so that the latest reference luminance value can be used. For this purpose, the time when the class changes to the unstable class from the stable class through the intermediate class is regarded as an update timing. At the update timing, a mean value of the luminance normal distribution of the largest weight is obtained as a reference luminance value, whereby the reference luminance value is updated. In the example shown in FIG. 3, the update timing is time t1.

A method of not updating a reference luminance value when an object stays only for a short time is described below. That is, until a predetermined time period (predetermined stay period) elapses from a change-of-luminance detection timing when a post-change luminance value is obtained, that is, from the time when the luminance value of the pixel changes, update of the reference luminance value is prohibited even if the next luminance update timing comes. Accordingly, an object that stays only for a short time is not detected as an unmoving object.

In FIG. 5, time t1 when the class changes to the unstable class from the stable class through the intermediate class is a timing to update the reference luminance value. At the timing, a mean value of the luminance normal distribution of the largest weight at the time is set as the reference luminance value.

In the example shown in FIG. 5, a mean value of the luminance normal distribution of the largest weight is obtained at time t3 of the change-of-luminance detection timing after time t1, so that a post-change luminance value is obtained. The post-change luminance value is compared with the reference luminance value, whereby the state where something has entered the monitored area is recognized. However, as described below, a detection result indicating an unmoving object has been detected is not output in this state, where something has entered the monitored area, but the detection result indicating an unmoving object has been detected is output after the object has stayed in the monitored area for a predetermined time period.

If the time period from time t3 to time t4, when the class changes to the unstable class from the stable class through the intermediate class, is shorter than the predetermined stay period, the reference luminance value is not updated at time t4. Therefore, the reference luminance value is kept at the luminance value of the background updated at time t1, and is not updated to the luminance value of the object that has entered the monitored area.

After time t4, at time t6 of a change-of-luminance detection timing when the class changes to the stable class from the unstable class through the intermediate class, the object that entered the monitored area disappears, so that the luminance value of the pixel of the original background is obtained as a post-change luminance value. The post-change luminance value obtained at this time is the luminance value of the background. As described above, the reference luminance value at this time is the luminance value of the background. Therefore, the post-change luminance value and the reference luminance value compared at time t6 are the same, so that an unmoving object is not detected.

Figure 1:
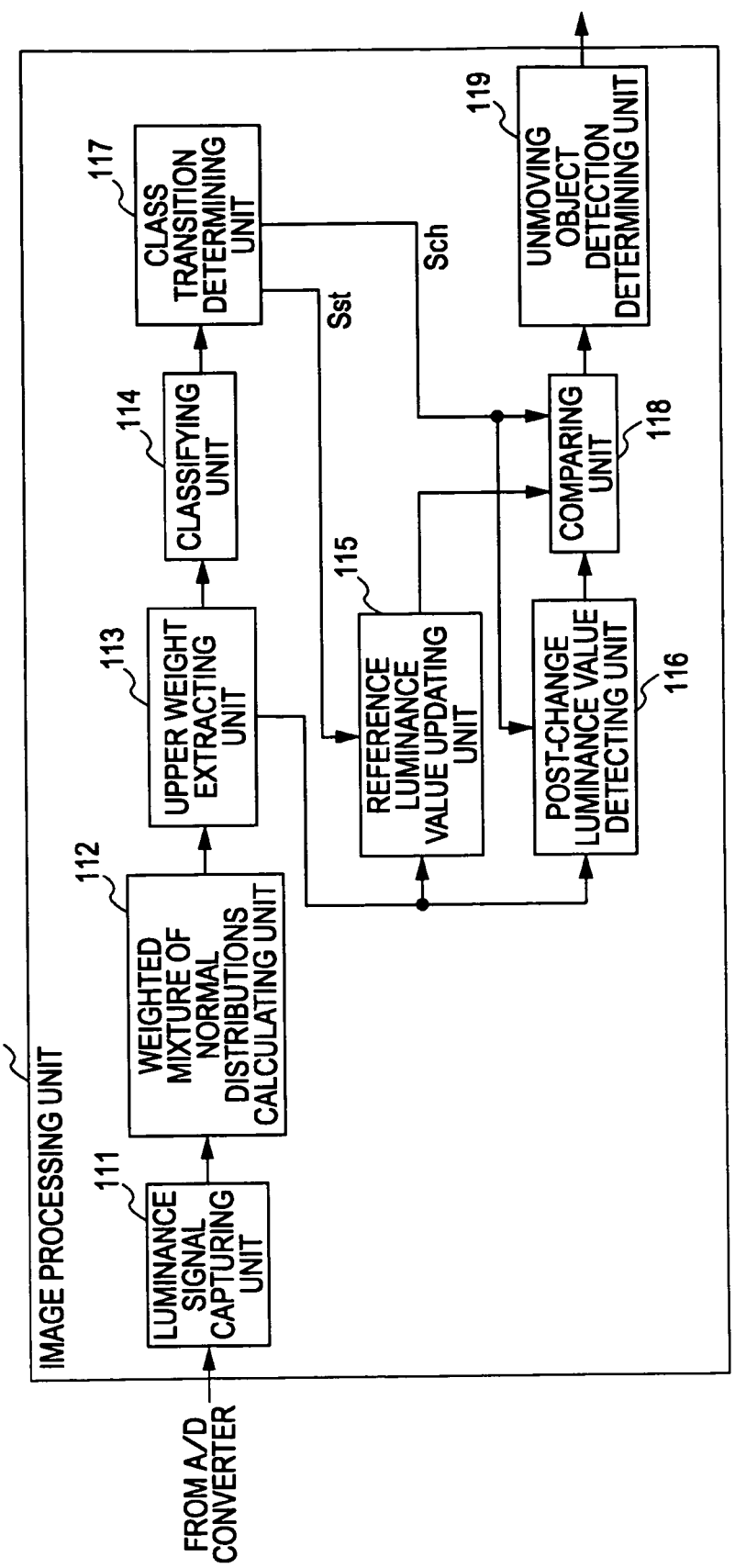
FIG. 1 is a functional block diagram showing an image processing apparatus according to an embodiment of the present invention.

FIG. 1 shows a functional block diagram showing a processing function to detect an unmoving object in the image processing unit 13 that executes the above-described process. The function shown in FIG. 1 corresponds to a detecting process in units of pixels in an unmoving object detecting process (described below).

A luminance signal capturing unit 111 receives and captures a digital luminance signal DY of each pixel from the A/D converter 12 and transmits a luminance value of the captured pixel to a weighted mixture of normal distributions calculating unit 112.

The weighted mixture of normal distributions calculating unit 112 determines whether the luminance value of the captured pixel belongs to which of a plurality of luminance normal distributions, and updates the weights and mean values of the respective luminance normal distributions. Then, the weighted mixture of normal distributions calculating unit 112 supplies a calculation result (including at least the weights and mean values (mean luminance values) of the respective distributions) to an upper weight extracting unit 113.

The upper weight extracting unit 113 supplies the weights of the luminance normal distributions having upper two weights among the plurality of luminance normal distributions to a classifying unit 114 and also supplies a mean luminance value of the distribution having the largest weight to a reference luminance value updating unit 115 and to a post-change luminance value detecting unit 116.

The classifying unit 114 classifies a present change state of the luminance of the pixel on the basis of the above-described expressions (10) and (11) by using the upper two weights and supplies information about a classification result to a class transition determining unit 117.

The class transition determining unit 117 determines a temporal transition of the information supplied from the classifying unit 114. In this embodiment, the class transition determining unit 117 generates an update timing signal Sst of a reference luminance value and a change-of-luminance detection timing signal Sch on the basis of the determined transition in the classes.

Figure 6:
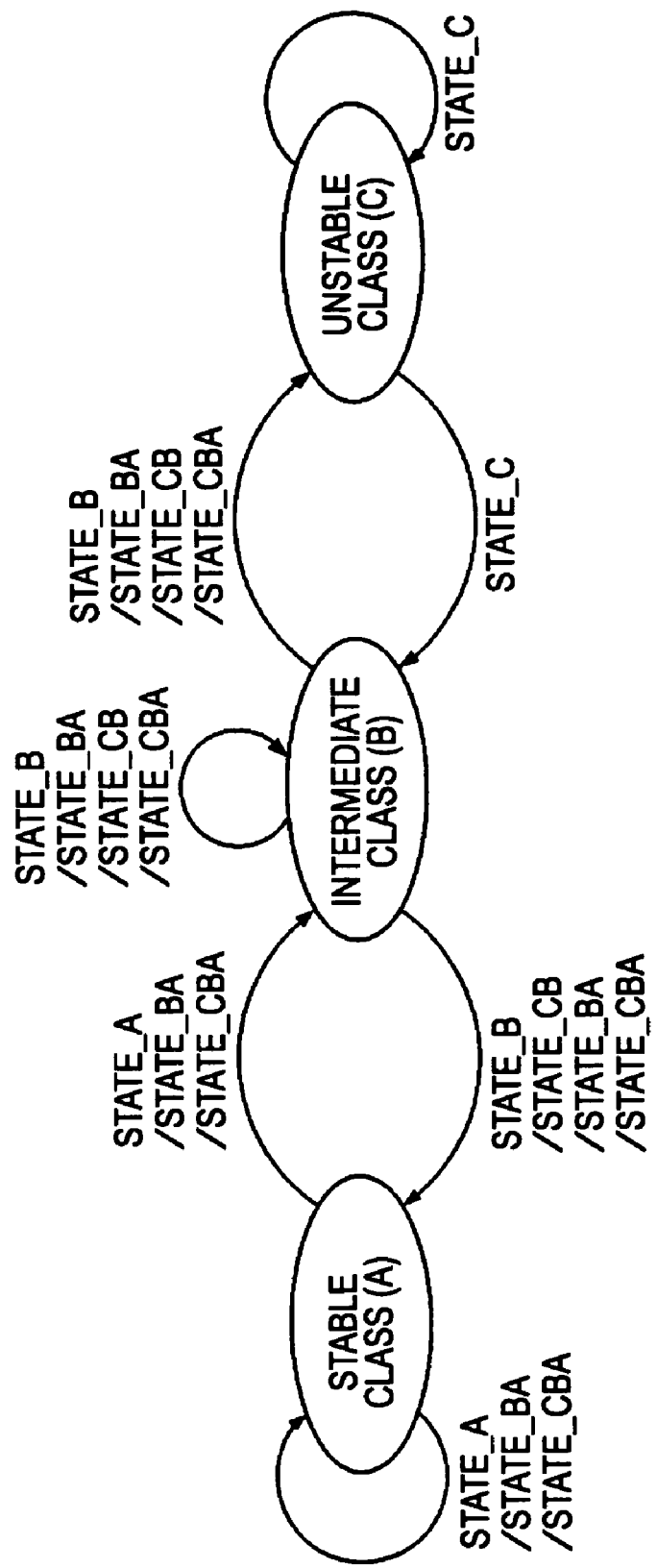
FIG. 6 illustrates a main part of the image processing method according to the embodiment of the present invention.

FIG. 6 shows a transition state in the case where a luminance state of a pixel is classified into one of the three classes: the stable class, the intermediate class, and the unstable class, on the basis of the ratio between upper two weights.

In FIG. 6, the stable class is represented by A, the intermediate class is represented by B, and the unstable class is represented by C for convenience. A transition state value indicating a transition state is represented by STATE_X. Herein, "X" in the transition state value STATE_X becomes C (STATE_C) when the class changes to the unstable class C. At the other time, the value indicates a previous class.

More specifically, STATE_A and STATE_B are transition state values in the case where an initial state is class A and class B, respectively. When the initial state is class C, the transition state value is STATE_C. STATE_BA is a transition state value in the case where the class has changed from class A to class B or from class B to class A. STATE_CB is a transition state value in the case where the class has changed from class B to class C or from class C to class B. STATE_CBA is a transition state value in the case where the class has changed from class A to class B and then to class C, or from class C to class B and then to class A.

If the transition state value in the initial state is STATE_A and if the class changes from stable through intermediate to unstable, the transition state value changes from STATE_A to STATE_BA and then to STATE_C.

For example, STATE_A indicates that the distribution of the largest weight does not change and that no change has occurred. STATE_CBA indicates a distribution whose weight has changed from the second largest to the largest. That is, STATE_CBA indicates that an object has disappeared from a monitored area or that a still object has appeared in the monitored area.

Therefore, in this embodiment, the timing to detect an unmoving object, that is, the change-of-luminance detection timing, is when the transition state value is STATE_CBA. In order to enhance stability, the class transition determining unit 117 does not set the change-of-luminance detection timing just after the transition state value becomes STATE_CBA but sets the change-of-luminance detection timing after the state of STATE_CBA has continued for a predetermined time period, and then generates and outputs a change-of-luminance detection timing signal Sch.

For example, in this embodiment, detection of a change in luminance (detection of an unmoving object) is performed not every frame but every four frames of an image signal from the monitoring camera 11, and the time point after the state of STATE_CBA has continued thirty times (for four seconds) is set as a change-of-luminance detection timing. In the example shown in FIG. 3, time t2 is the time when the transition state value becomes STATE_CBA, and the change-of-luminance detection timing is time t3.

The class transition determining unit 117 sets a reference luminance value update timing to a time when the relationship between the upper two weights belongs to the unstable class and when the previous transition state value is STATE_BA or STATE_CBA that indicates the class was previously the stable class. The class transition determining unit 117 generates an update timing signal Sst of the reference luminance value at this timing to update the reference luminance value. The update timing is time t1 in the example shown in FIG. 3.

Note that, the class transition determining unit 117 does not generate an update timing signal Sst of the reference luminance value so that the reference luminance value is not updated even at the update timing if a predetermined stay period has not elapsed from the time when a change-of-luminance detection timing signal Sch was previously generated, so that an object staying only for a short time is not detected as an unmoving object.

In this embodiment, a flag indicating whether update of the reference luminance value is permitted (hereinafter referred to as an update flag) is used. The update flag is set to "false" in the initial state so as to permit update. That is, the update flag is referred to at an update timing. When the update flag is "false", an update timing signal Sst is generated and output. After the reference luminance value is updated at the update timing, that is, after the update timing signal Sst is output, the update flag is set to "true" so that update is prohibited. When the update flag is "true", the class transition determining unit 117 does not output an update timing signal Sst.

After the update flag has been "true" for more than a predetermined stay period during which an unmoving object to be detected stays, the class transition determining unit 117 sets the update flag to "false" so as to permit output of an update timing signal Sst. Alternatively, the class transition determining unit 117 may change the state of the update flag from "true" to "false" upon determining that the luminance of the pixel is kept unchanged.

In this way, the class transition determining unit 117 generates an update timing signal Sst of the reference luminance signal and supplies the update timing signal Sst to the reference luminance value updating unit 115. The reference luminance value updating unit 115 updates the reference luminance value by obtaining a mean value of the luminance normal distribution of the largest weight as the reference luminance value in response to the update timing signal Sst.

Also, the class transition determining unit 117 supplies the change-of-luminance detection timing signal Sch generated in the above-described way to the post-change luminance value detecting unit 116. The post-change luminance value detecting unit 116 obtains a mean value of the luminance normal distribution of the largest weight as a post-change luminance value by receiving the change-of-luminance detection timing signal Sch.

Then, the reference luminance value updated by the reference luminance value updating unit 115 is supplied to a comparing unit 118, and the post-change luminance value obtained by the post-change luminance value detecting unit 116 is supplied to the comparing unit 118. In addition, the change-of-luminance detection timing signal Sch from the class transition determining unit 117 is supplied as a comparison timing signal to the comparing unit 118.

The comparing unit 118 compares the post-change luminance value obtained by the post-change luminance value detecting unit 116 with the reference luminance value updated by the reference luminance value updating unit 115, and determines whether a significant difference exists therebetween. The determination result is supplied to an unmoving object detection determining unit 119.

The unmoving object detection determining unit 119 receives the determination result from the comparing unit 118. If the determination result indicates that a significant difference exists between the post-change luminance value and the reference luminance value, the unmoving object detection determining unit 119 stores that time, e.g., a frame number, as an unmoving object detection time. If a state where the determination result indicates that the significant difference exists continues thereafter, an unmoving object detection result is output from the image processing unit 13 to the unmoving object detection notifying unit 14 after a predetermined time period, so that the unmoving object detection notifying unit 14 outputs an alarm or the like.

Hereinafter, a process performed by the image processing unit 13 in the cases shown in FIGS. 3 and 5 is further described.

For example, in FIG. 3, the update flag is set to "false" and the reference luminance value is set to m1_t0 in an initial state t=t0. At time t1 shown in FIG. 3, the update flag is "false", the state of the luminance of the pixel belongs to the unstable class on the basis of the relationship between the upper two weights, and the previous transition state value is STATE_BA. Thus, an update timing signal Sst is generated, the reference luminance value is updated from m1_t0 to m1_t1, and the update flag is set to "true".

Then, at time t3, a change-of-luminance detection timing signal Sch is generated. Accordingly, the reference luminance value m1_t1 is compared with a post-change luminance value m2_t3, so that a change in the luminance value of the pixel is detected. At this time, since a significant difference exists between the reference luminance value m1_t1 and the post-change luminance value m2_t3, the image processing unit 13 stores that time, e.g., a frame number, as a detection time. If no change occurs thereafter, the image processing unit 13 outputs an alarm after a predetermined time period.

Next, a process performed in the case shown in FIG. 5, that is, the case where a once-stopped object moves before a predetermined stay time elapses, is described.

Referring to FIG. 5, f1(w1_t, m1_t) indicates a change in weight of a road, whereas f2(w2_t, m2_t) indicates a change in weight of a car, as described above. At an initial state t0, the update flag is set to "false" and the reference luminance value is set to m1_t0.

At time t1, the relationship between the upper two weights is in the unstable class. Since the previous transition state value is STATE_BA, the reference luminance value is updated from m1_t0 to m1_t1 and the update flag is set to "true".

Then, at time t3, the reference luminance value m1_t1 is compared with a post-change luminance value m2_t3 in order to detect a change in the luminance of the pixel. At time t4, the update flag is not returned to "false" and is kept at "true" because the predetermined stay time has not elapsed since the previous change-of-luminance detection timing t3. Therefore, the reference luminance value is not updated at time t4.

At time t6, which is the next change-of-luminance detection timing, the reference luminance value m1_t1 is compared with a post-change luminance value m1_t6 of time t6, and thus it is detected that the luminance of the pixel is unchanged. In this way, if an object stays in a monitored area for a shorter time than the predetermined stay period and then disappears from the monitored area as in the case shown in FIG. 5, an alarm to indicate an unmoving object detection result is not output.

The above description is about the functional block diagram shown in FIG. 1. Actually, in this embodiment, the above-described image processing to detect an unmoving object is executed by software processing in the image processing unit 13. Hereinafter, the image processing by the software processing is described with reference to flowcharts. The respective steps of each flowchart described below are executed by the CPU 100 in accordance with a processing program stored in the ROM 102 by using the RAM 103 as a work area.

Figure 7:
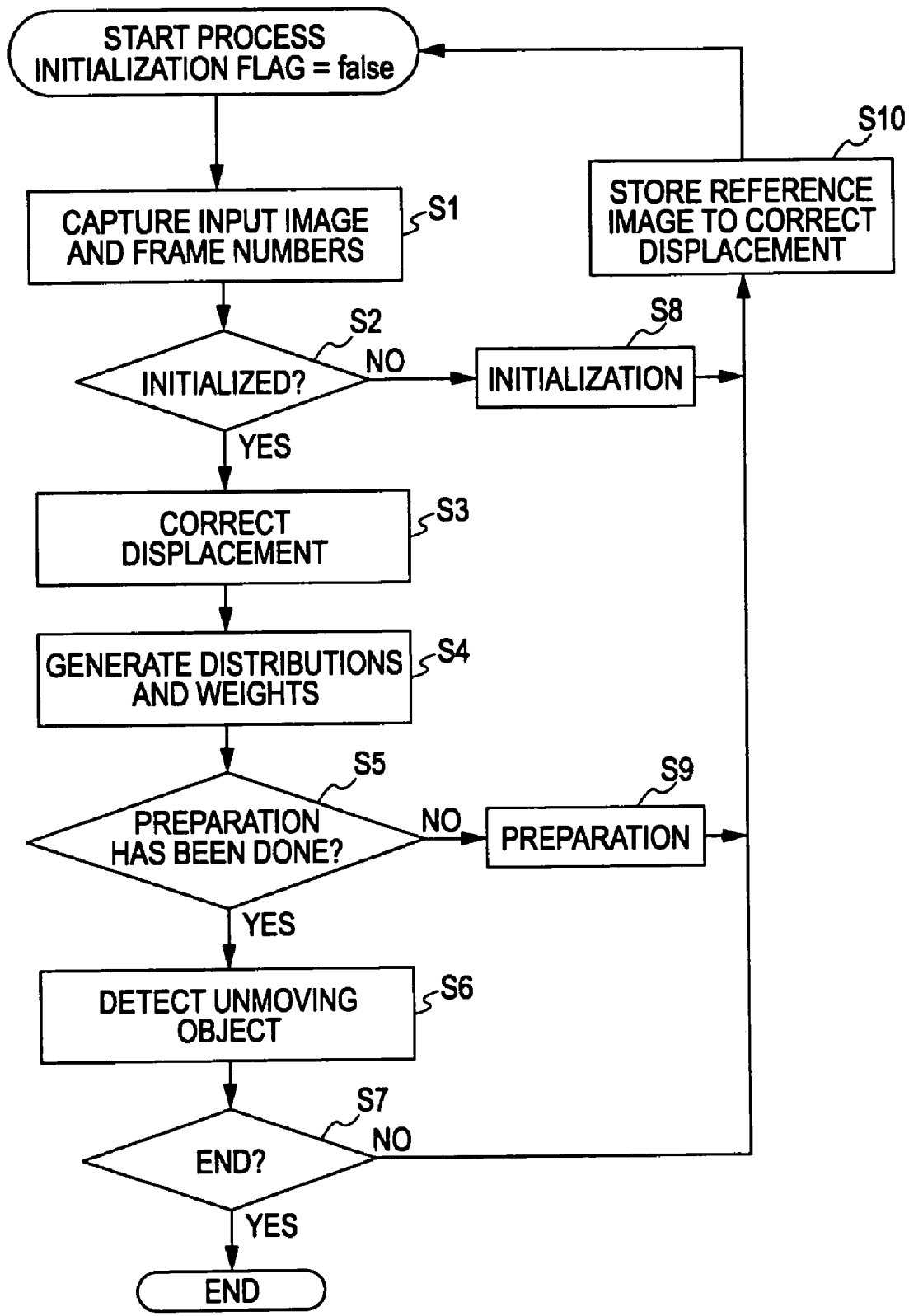
FIG. 7 is a flowchart illustrating an image processing operation according to the image processing method.

FIG. 7 is a flowchart showing the entire image processing performed in the image processing unit 13. First, an initialization flag indicating whether initialization has been done is set to "false", and then the process starts.

Then, input data is captured from the monitoring camera 11. The input data includes information about an input image and frame numbers to measure time (step S1).

Then, whether the initialization flag is "false" is determined (step S2). If the initialization flag is "false", initialization is executed (step S8). The initialization performed in step S8 is shown in the flowchart shown in FIG. 8.

Figure 8:
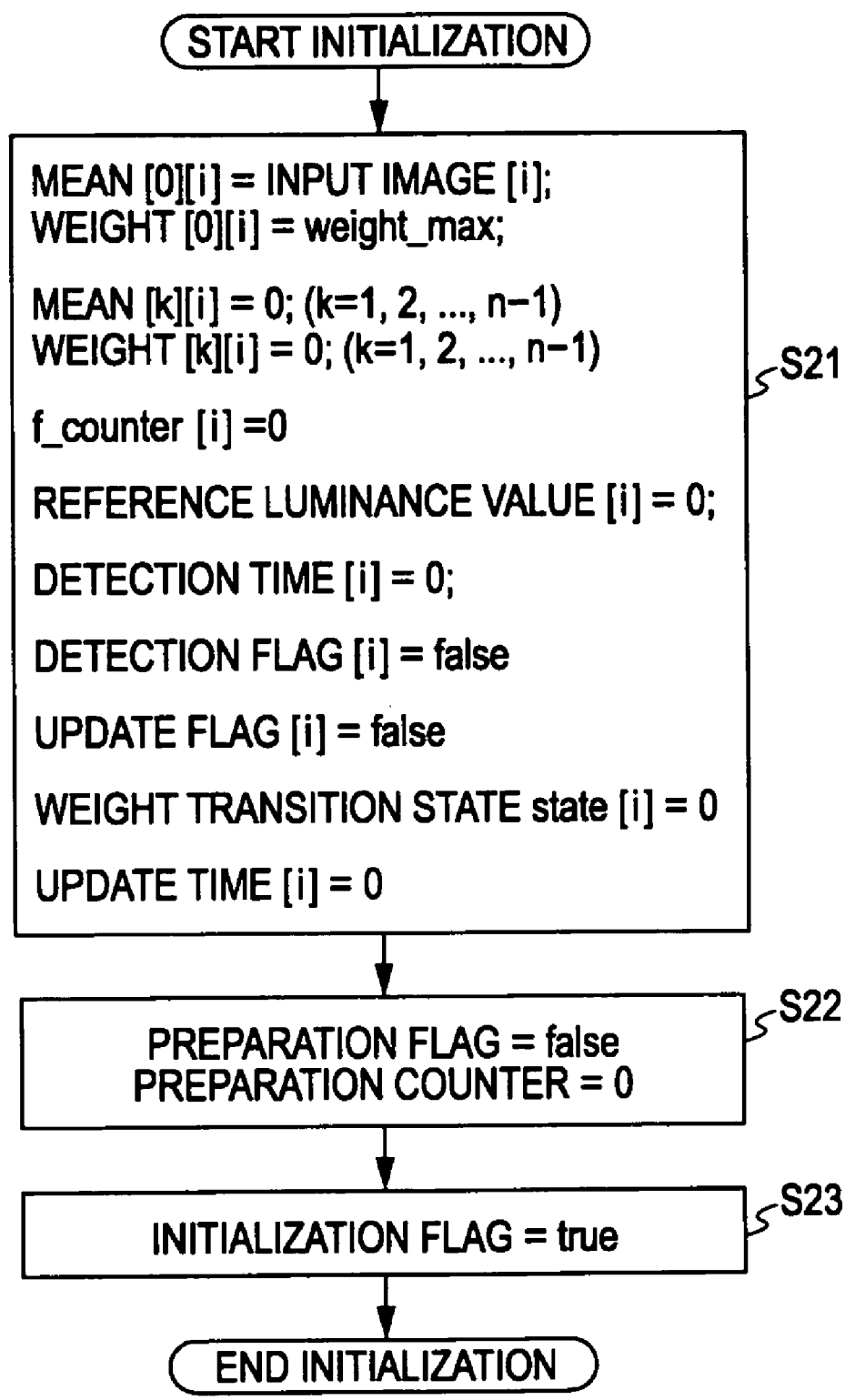
FIG. 8 is a flowchart illustrating an image processing operation according to the image processing method.

In the initialization performed in step S8, a memory to be used and variables are initialized (step S21). In FIG. 8, "n" indicates the number of mean values and weights of luminance normal distributions (that is, the number of luminance normal distributions). For example, n=4. "k" indicates the mean value and weight of the k-th distribution. "i" indicates a pixel number, and $0 \leq i < M$ (=the maximum number of pixels according to an image size) is satisfied.

In this embodiment, the following variable data and flag information are stored in the memory.

A mean value of a distribution: mean [n] [i] ($0 \leq i < M$)
Weight: weight [n] [i] ($0 \leq i < M$)
Duration since the transition state value becomes STATE_CBA: duration count number f_counter [i] ($0 \leq i < M$)
Reference luminance value: reference luminance value [i] ($0 \leq i < M$)
Time when a change in luminance is detected: detection time [i] ($0 \leq i < M$)
Flag indicating whether luminance has changed: detection flag [i] ($0 \leq i < M$)
Flag indicating whether the reference luminance value can be updated: update flag [i] ($0 \leq i < M$)
Transition state value of upper two weights: state [i] ($0 \leq i < M$)
Time to update the reference luminance value: update time [i] ($0 \leq i < M$)

As shown in FIG. 8, in the initialization in step S21, the initial value of the mean [0] [i] is set to the luminance value of a pixel i of the input image, and the initial value of the weight [0] [i] is set to a maximum value weight_max, e.g., 1.0, for all of the pixels ($0 < i < M$). The initial value of the mean [k] [i] (k=1, 2, ..., n-1) is set to 0, the initial value of the weight [k] [i] (k=1, 2, ..., n-1) is set to 0, the initial value of the duration count number f_counter [i] is set to 0, the initial value of the reference luminance value [i] is set to 0, the initial value of the detection time [i] is set to 0, the initial value of the detection flag [i] is set to "false", the initial value of the update flag [i] is set to "false", and the initial value of the update time [i] is set to 0.

The input image may include a moving object. Thus, the mean value (mean [0] [i]) of the distribution of the maximum weight may include a movable object at this stage. If a process of detecting an unmoving object starts in this state, a state where a pixel of a moving object has changed to that of a background is detected. Therefore, preparation is performed so that the mean value of the distribution indicating the maximum weight is not the value of a moving object. For this purpose, the process proceeds from step S21 to step S22, where a preparation counter and a preparation flag used in the preparation are initialized. Specifically, the preparation counter is set to 0 and the preparation flag is set to "false".

After steps S21 and S22, the initialization flag is set to "true", which indicates that the initialization has been done (step S23), and then the initialization shown in FIG. 8 ends.

After the initialization, the process proceeds to step S10 in FIG. 7. In step S10, the input image is stored as a reference image to correct displacement. Even if the monitoring camera is fixed, an image in a monitored area may be displaced due to vibrations or the like. Therefore, the displacement is corrected in this embodiment. In step S10, a reference image for displacement correction is stored. Herein, the input image is stored as an initial image.

The reference image may be updated every time a process of detecting an unmoving object is performed. Alternatively, a displacement detecting unit to detect displacement of an image may be provided so that the reference image is updated every time the displacement detecting unit detects displacement. In this embodiment, the reference image is updated every time a process of detecting an unmoving object is performed, specifically, every four frames (described below). After step S10, the process returns to step S1, where a next input image is waited for.

If it is determined in step S2 that the initialization flag is "true" and that the initialization has been done, the process proceeds to step S3 to correct displacement. In step S3, the present input image is compared with the stored reference image in order to calculate a displacement amount, and internal data is corrected if displacement exists. Then, the process proceeds to step S4, where distributions and weights are generated.

Figure 9:
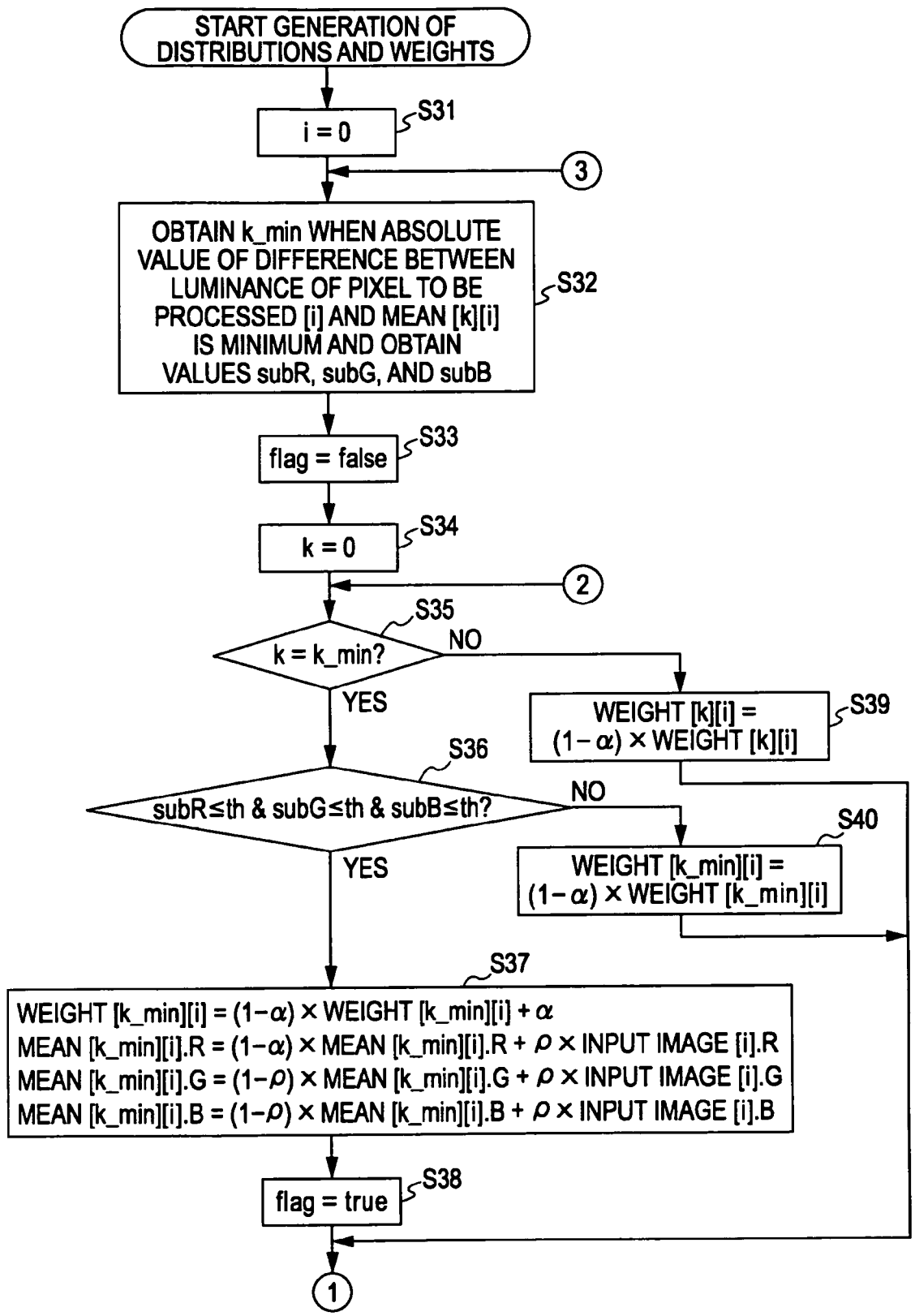
FIG. 9 is a flowchart illustrating an image processing operation according to the image processing method.
Figure 10:
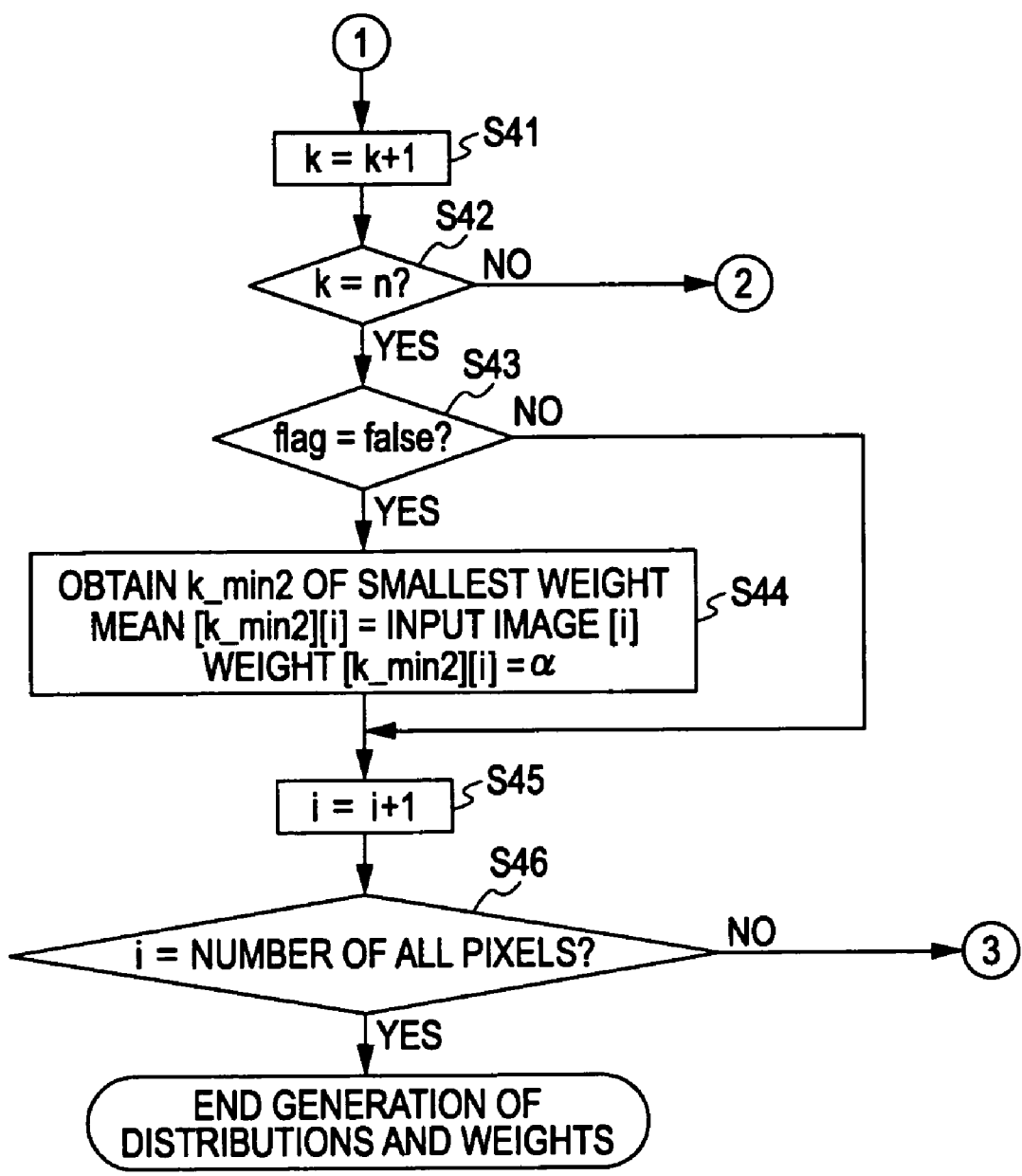
FIG. 10 is a flowchart illustrating an image processing operation according to the image processing method.

FIGS. 9 and 10 show a flowchart of a process of generating distributions and weights performed in step S4. As described above, "i" indicates a pixel number. "n" indicates the number of mean values and weights of normal distributions, and "k" indicates a mean value and a weight of the k-th distribution. In this process of generating distributions and weights, the following process is performed on each pixel.

First, a first pixel of the input image is specified as a pixel to be processed [i] (step S31). Then, k=k_min when an absolute value of a difference between the luminance value of the pixel to be processed [i] and a mean value [k] [i] ($0 \leq k \leq n-1$) of the distribution becomes minimum is obtained. Further, the absolute value of the difference at the time is obtained for each of three-primary-color data R, G, and B of the pixel to be processed [i], as values subR, subG, and subB (step S32).

Then, since the luminance of the pixel to be processed [i] may not belong to any distribution, a flag to determine such a state is initialized by "false" (indicating that the luminance does not belong to any distribution) (step S33). Then, a first distribution is specified by setting k to 0 (step S34).

Then, it is determined whether k=k_min (step S35). If k is not k_min, the k-th weight is reduced in accordance with the above-described expression (6) (step S39). Then, the process proceeds to step S41 in FIG. 10, where the next distribution is specified by setting k to k+1. Then, it is determined in step S42 whether the value of k after the specification is n (the maximum number of distributions). If k is not n, the process returns to step S35 and the subsequent steps are repeated.

If it is determined in step S35 that k=k_min, the luminance of the pixel to be processed [i] may belong to the k_min-th distribution. In this case, whether all of the values subR, subG, and subB are equal to or smaller than a threshold th (e.g., th=$2\sigma$) is determined (step S36).

If it is determined in step S36 that not all of the values subR, subG, and subB are equal to or smaller than the threshold th, the k_min-th weight is reduced in accordance with the above-described expression (6) (step S40). Then, the process proceeds to step S41 in FIG. 10, and the next distribution is specified by setting k to k+1. Then, it is determined in step S42 whether the value of k after the specification is n (the maximum number of distributions). If k is not n, the process returns to step S35 and the subsequent steps are repeated.

If it is determined in step S36 that all of the values subR, subG, and subB are equal to or smaller than the threshold th, the luminance of the pixel to be processed [i] is determined to belong to the distribution. Then, the weight and mean value are updated in accordance with the above-described expressions (5) and (7) (step S37), and the flag is set to "true" (step S38). At this time, the mean value is independently updated for each of the three-primary-color data R, G, and B of pixel data. If the variance $\sigma$ is updated, the normal distribution becomes steeper and the range of the threshold becomes narrow. Therefore, the variance $\sigma$ is fixed (e.g., 8) in this embodiment.

After step S38, the process proceeds to step S41 in FIG. 10, where the next distribution is specified by setting k to k+1. Then, it is determined in step S42 whether the value of k after the specification is n (the maximum number of distributions). If k is not n, the process returns to step S35 and the subsequent steps are repeated.

If it is determined in step S42 that k=n, all distributions have been processed. Then, the status of the flag is determined (step S43). If the flag is "false", the luminance does not belong to any distribution. In that case, k=k_min2 of the smallest weight is obtained, the luminance value of the pixel to be processed [i] is substituted into the mean [k_min2] [i] thereof, and the weight [k_min2] [i] is set to $\alpha$ (step S44).

If it is determined in step S43 that the flag is "true" or after step S44, the process proceeds to step S45, where i is set to i+1 and the next pixel to be processed [i] is specified. Then, whether all of the pixels have been processed is determined by referring to the pixel number of the specified pixel (step S46). If not all of the pixels have been processed, the process returns to step S32 and the subsequent steps are repeated.

If it is determined in step S46 that all of the pixels have been processed, the process of generating distributions and weights completes.

Referring back to FIG. 7, after the process of generating distributions and weights in step S4 has been done, the process proceeds to step S5, where whether preparation has been done is determined by checking the preparation flag described above with reference to step S22 in FIG. 8. If it is determined in step S5 that the preparation flag is "false", preparation is performed (step S9).

As described above, in this embodiment, the luminance of the input image is used as the initial value of the mean value of the distribution, so that the input image may include a moving object. Therefore, if detection of an unmoving object is immediately started, a state where the moving object has disappeared is detected. In order to prevent such a state, generation of distributions and weights is repeated so that the mean value of the distribution of the maximum weight of the pixel corresponding to the moving object changes from the moving object to a background.

Figure 11:
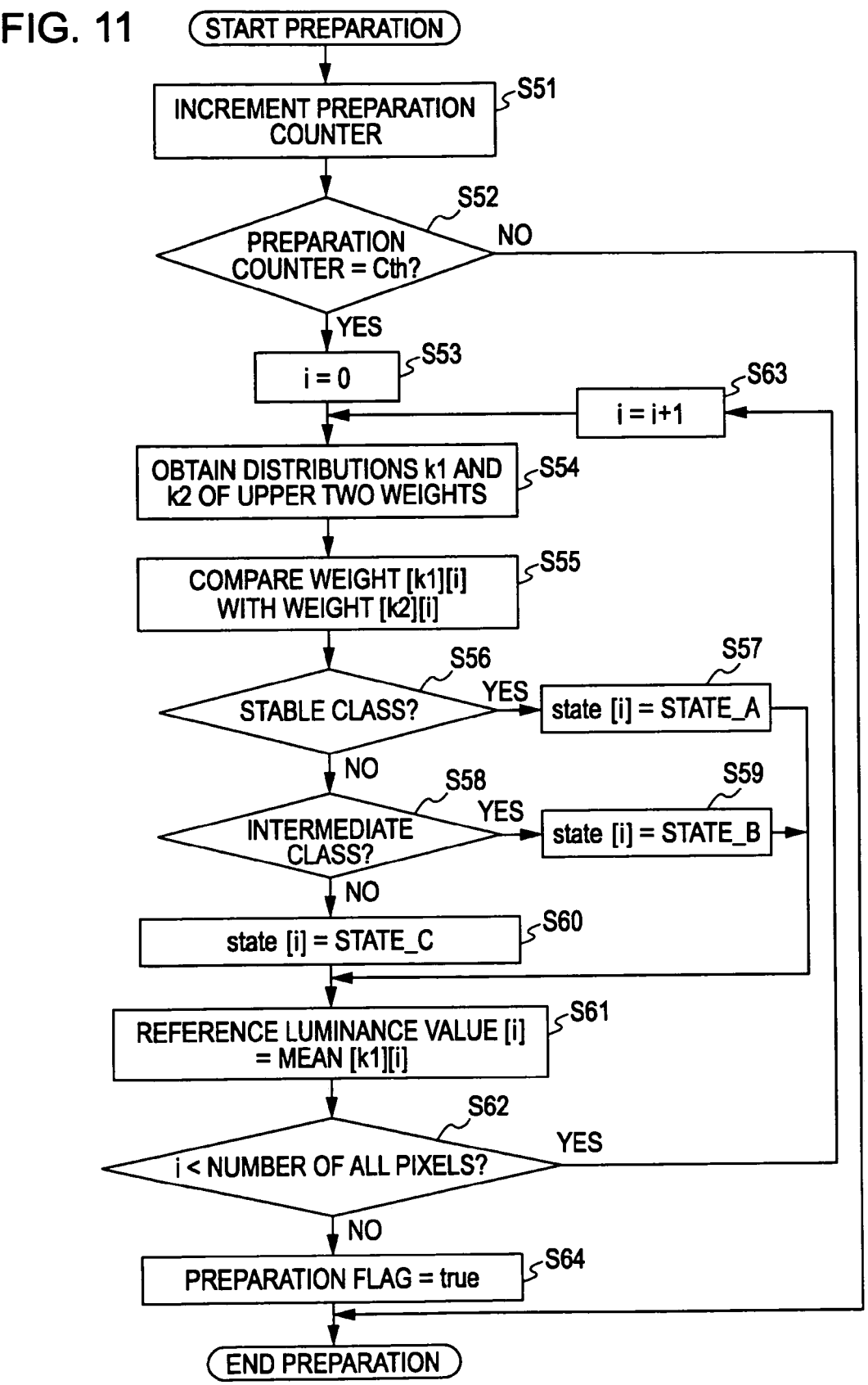
FIG. 11 is a flowchart illustrating an image processing operation according to the image processing method.

FIG. 11 shows an example of a flowchart showing the preparation process.

First, the count value of the preparation counter, which was initialized to 0 in step S22 of the above-described initialization process, is incremented (step S51) in response to the determination in step S5 that the preparation flag is "false".

Then, whether the count value of the preparation counter has reached a threshold Cth, e.g., 300, is determined (step S52). If the count value of the preparation counter has not reached the threshold Cth, the preparation process ends and the process returns to step S10 shown in FIG. 7, where the reference image to correct displacement is updated. Then, the process returns to step S1, where a next input image is waited for. Then, step S1 and the subsequent steps are repeated until the count value of the preparation counter becomes equal to the threshold Cth.

If it is determined in step S52 that the count value of the preparation counter has become equal to the threshold Cth, the following steps are performed as a final process of the preparation.

First, among weights [k] [i] ($0 \leq k < n-1$), k1 and k2 ($k1 \geq k2$) corresponding to the upper two weights are obtained (step S54). Then, the weight [k1] [i] is compared with the weight [k2] [i] (step S55), and the state of the luminance is classified into one of the three classes (stable class, intermediate class, and unstable class) by using the comparison result. For example, if $k1/k2 \geq 1.5$, the state of the luminance belongs to the stable class. If $k1/k2 < 1.5$ and $k1/k2 \geq 1.1$, the state of the luminance belongs to the intermediate class. Other than that, the state of the luminance belongs to the unstable class.

On the basis of the comparison result between the weight [k1] [i] and the weight [k2] [i], whether the state of the luminance belongs to the stable class is determined (step S56). If it is determined that state of the luminance belongs to the stable class, the state transition value state[i] is set to STATE_A (step S57). If it is determined in step S56 that the state of the luminance does not belong to the stable class, the process proceeds to step S58, where whether the state of the luminance belongs to the intermediate class is determined on the basis of the comparison result between the weight [k1] [i] and the weight [k2] [i]. If it is determined in step S58 that the state of the luminance belongs to the intermediate class, the state transition value state[i] is set to STATE_B (step S59). If it is determined in step S58 that the state of the luminance does not belong to the intermediate class, the state of the luminance is determined to belong to the unstable class, and the state transition value state[i] is set to STATE_C (step S60).

After step S57, S59, or S60, the process proceeds to step S61, where the mean value of the distribution of k1 corresponding to the maximum weight: mean [k1] [i] is set as the reference luminance value [i].

Then, whether all of the pixels have been processed is determined (step S62). If there is a pixel that has not been processed, the next pixel number is specified (step S63) and the process returns to step S54, and the subsequent steps are repeated. If it is determined in step S62 that all of the pixels have been processed, the preparation flag is set to "true" (step S64) and the preparation process completes.

Referring back to FIG. 7, after the preparation in step S9 has been done, the process proceeds to step S10, where the reference image to correct displacement is updated. Then, a next input image is waited for.

If it is determined in step S5 shown in FIG. 7 that preparation has been done (the preparation flag is "true"), the process proceeds to step S6 to detect an unmoving object.

Figure 12:
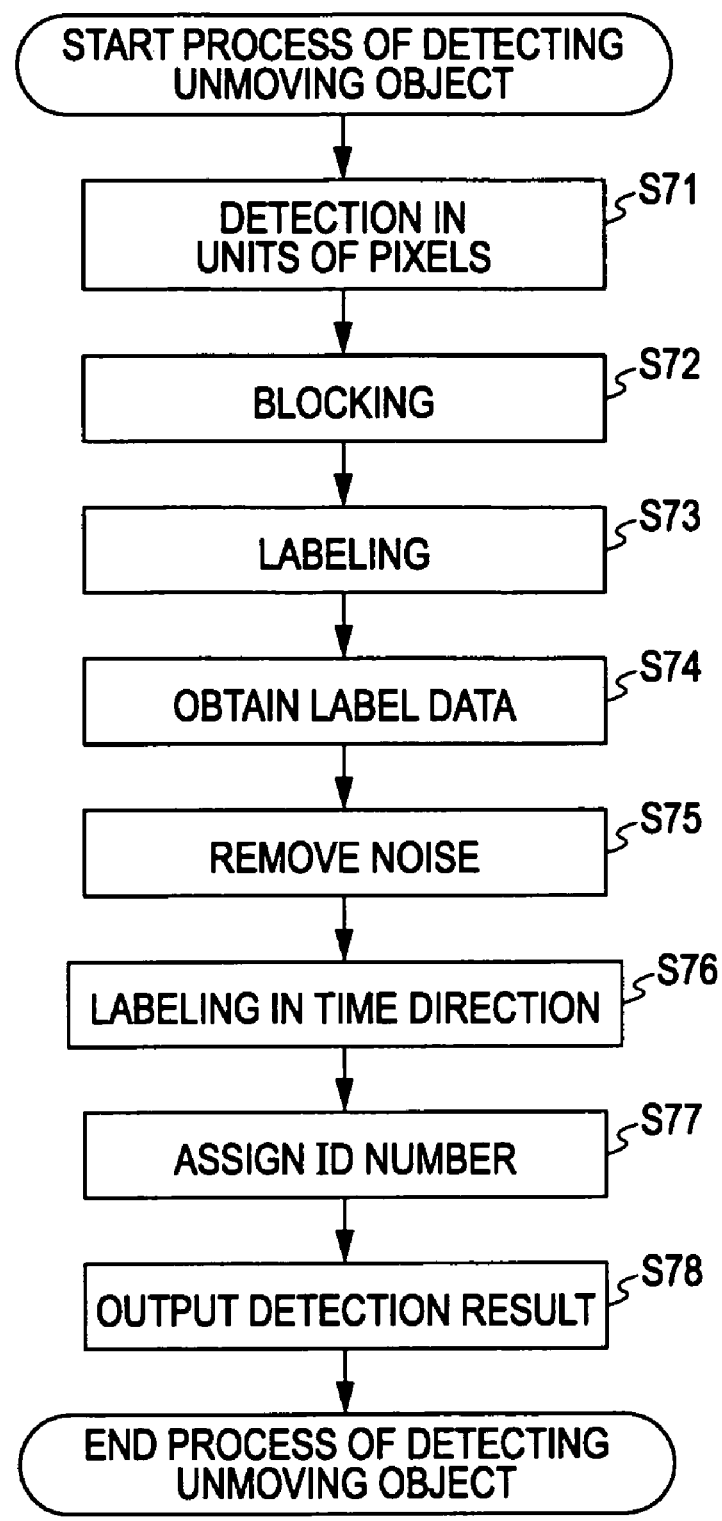
FIG. 12 is a flowchart illustrating an image processing operation according to the image processing method.

FIG. 12 shows an example of a flowchart illustrating a process of detecting an unmoving object.

Figure 13:
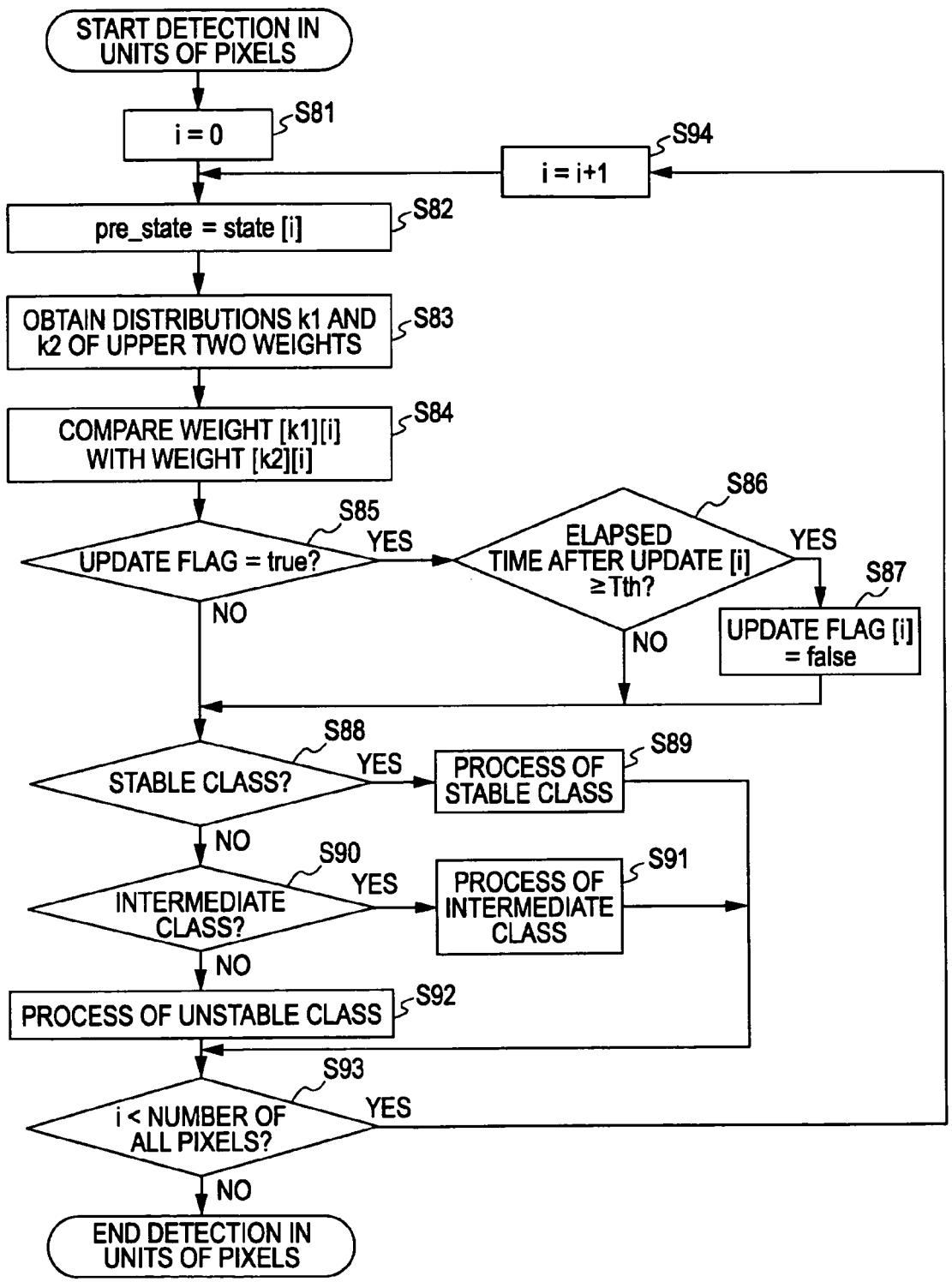
FIG. 13 is a flowchart illustrating an image processing operation according to the image processing method.

As shown in FIG. 12, in the process of detecting an unmoving object in this embodiment, detection in units of pixels is performed first (step S71). FIG. 13 shows an example of a flowchart illustrating the detection in units of pixels.

First, "i" indicating a pixel number is initialized by setting it to 0 (step S81), and the following process is performed on each pixel.

In order to store the previous state transition value, state[i] is substituted to pre_state indicating the previous state transition value (step S82). Then, among the weights [k] [i] ($0 \leq k < n-1$), k1 and k2 (k1≧k2) corresponding to the upper two weights are obtained (step S83). Then, the weight [k1] [i] is compared with the weight [k2] [i] (step S84), and the state of the luminance is classified into one of the three classes (stable class, intermediate class, and unstable class) by using the comparison result. As described above, if k1/k2≧1.5, the state of the luminance belongs to the stable class. If k1/k2<1.5 and k1/k2≧1.1, the state of the luminance belongs to the intermediate class. Other than that, the state of the luminance belongs to the unstable class.

As described above, in this embodiment, the update flag is changed from "false" to "true" after the reference luminance value is updated. The reference luminance value cannot be updated when the update flag indicates "true". In this embodiment, in order to prevent that the reference luminance value cannot be updated for a long time, the following measures are taken. That is, the elapsed time from when the reference luminance value was updated to the present is determined on the basis of the time when the reference luminance value was updated and the present frame number. If the elapsed time since the previous update is over a predetermined stay period, for example, over sixty minutes, update of the reference luminance value is permitted.

That is, it is determined whether the update flag [i] is "true" (step S85). If the update flag [i] is "true", duration after update [i] is obtained on the basis of the difference between an update time [i] (time when the reference luminance value was updated (time is obtained in the form of frame number)) and the present frame number. Then, the duration after update [i] is compared with a threshold Tth so as to determine whether the duration after update [i] is equal to or more than the threshold Tth (step S86). If it is determined in step S86 that the duration after update [i] is equal to or more than the threshold Tth, the update flag [i] is set to "false" (step S87).

The duration after update may be obtained on the basis of the difference between a detection time [i] (time when a post-change luminance value is obtained after a change occurs in the pixel (time is obtained in the form of frame number)) and the present frame number. In that case, a time period after an object has entered a monitored area and stopped there is obtained as a duration after update.

If it is determined in step S85 that the update flag is "false", or after the update flag [i] has been set to "false" in step S87, classification is performed by using the comparison result generated in step S84.

More specifically, it is determined whether the state of the luminance belongs to the stable class on the basis of the comparison result between the weight [k1] [i] and the weight [k2] [i] (step S88). If it is determined that the state of the luminance belongs to the stable class, a process of the stable class is performed (step S89).

If it is determined in step S88 that the state of the luminance does not belong to the stable class, the process proceeds to step S90, where it is determined whether the state of the luminance belongs to the intermediate class on the basis of the comparison result between the weight [k1] [i] and the weight [k2] [i]. If it is determined in step S90 that the state of the luminance belongs to the intermediate class, a process of the intermediate class is performed (step S91).

If it is determined in step S90 that the state of the luminance does not belong to the intermediate class, the state of the luminance is determined to belong to the unstable class, so that a process of the unstable class is performed (step S92).

After step S89, S91, or S92, the process proceeds to step S93, where whether all of the pixels have been processed is determined. If there is a pixel that has not been processed, the next pixel number is specified (step S94) and then step S82 and the subsequent steps are repeated. If it is determined in step S93 that all of the pixels have been processed, the detection in units of pixels completes.

Figure 14:
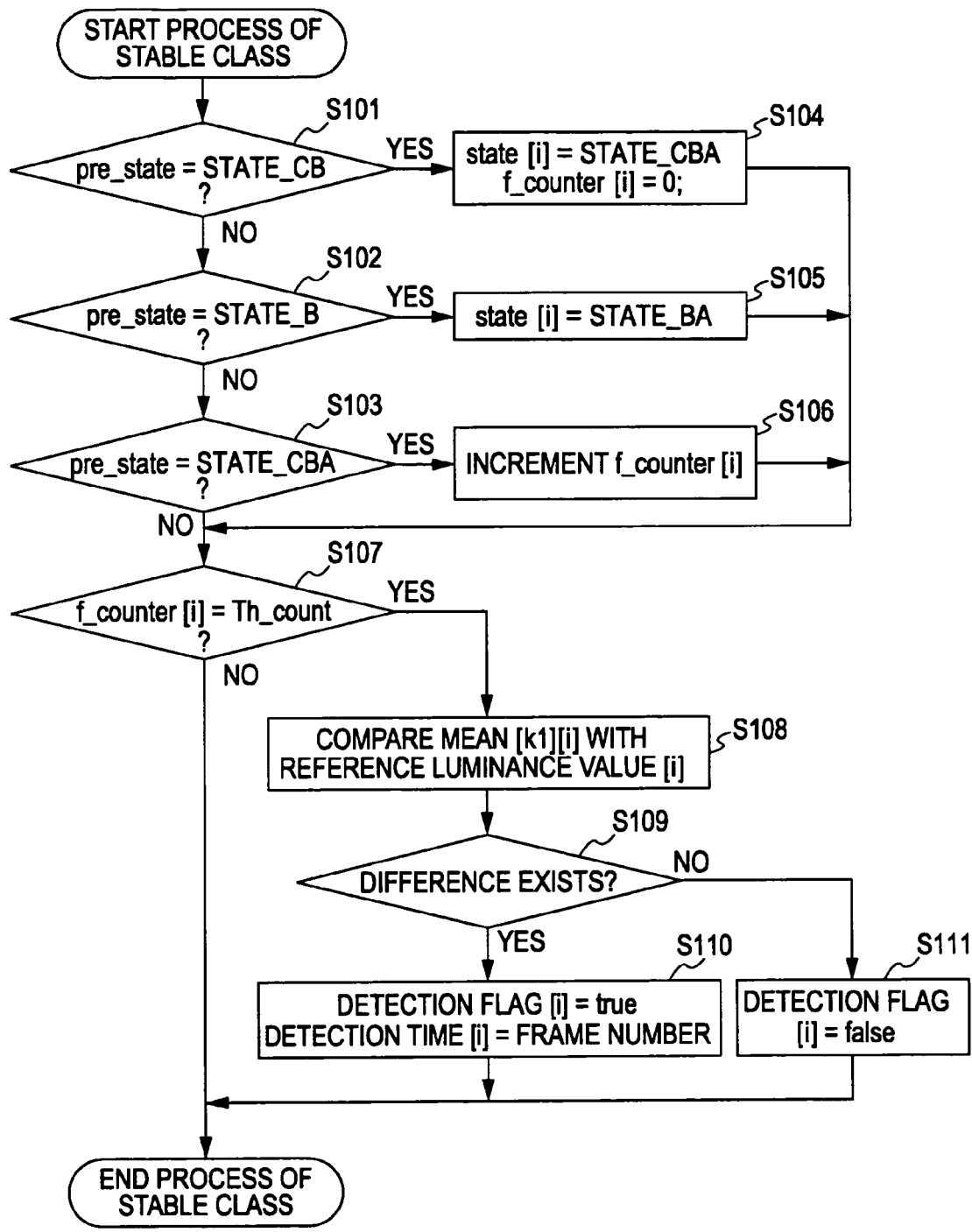
FIG. 14 is a flowchart illustrating an image processing operation according to the image processing method.

FIG. 14 is a flowchart showing an example of the process of the stable class performed in step S89. In the process of the stable class, the previous state transition value pre_state is obtained, and then it is determined whether the previous state transition value pre_state is STATE_CB (step S101).

If it is determined in step S101 that the previous state transition value pre_state is STATE_CB, the state transition value state[i] is updated to STATE_CBA, which indicates that the class has changed to the stable class from the unstable class through the intermediate class, and a duration count value f_counter[i] to measure the duration of the state transition value STATE_CBA about the pixel [i] is initialized to 0 (step S104). Herein, the duration of the state transition value STATE_CBA is measured in order to eliminate an object that temporarily stops and then disappears from the monitored area from a detection target.

If it is determined in step S101 that the previous state transition value pre_state is not STATE_CB, the process proceeds to step S102, where it is determined whether the previous state transition value pre_state is STATE_B. If it is determined in step S102 that the previous state transition value pre_state is STATE_B, the state transition value state[i] is updated to STATE_BA, which indicates that the class has changed from the intermediate class to the stable class (step S105).

If it is determined in step S102 that the previous state transition value pre_state is not STATE_B, the process proceeds to step S103, where it is determined whether the previous state transition value pre_state is STATE_CBA. If it is determined in step S103 that the previous state transition value pre_state is STATE_CBA, the duration count value f_counter[i] to measure the duration of the state transition value STATE_CBA about the pixel [i] is incremented (step S106).

After step S104, S105, or S106, the process proceeds to step S107, where it is determined whether the duration count value f_counter[i] has reached a threshold th_count, for example, 30.

If it is determined in step S107 that the duration count value f_counter[i] is under the threshold th_count, the process of the stable class ends and the process returns to that of the flowchart shown in FIG. 13.

If it is determined in step S107 that the duration count value f_counter[i] has become equal to the threshold th_count, the process proceeds to step S108, where the reference luminance value [i] of the pixel [i] is compared with the mean value of the luminance normal distribution corresponding to the maximum weight k1: mean [k1][i]. Then, it is determined whether a significant difference exists between the both values (step S109).

If it is determined in step S109 that a significant difference exists, that is, if it is determined that the luminance of the pixel [i] has changed, the detection flag [i] is set to "true", and the frame number at that time is stored as a detection time [i] (step S110).

If it is determined in step S109 that a significant difference does not exist, that is, if it is determined that the luminance of the pixel [i] has not changed, the detection flag [i] is set to "false" (step S111). After step S110 or S111, the process of the stable class ends and the process returns to that of the flowchart shown in FIG. 13.

Figure 15:
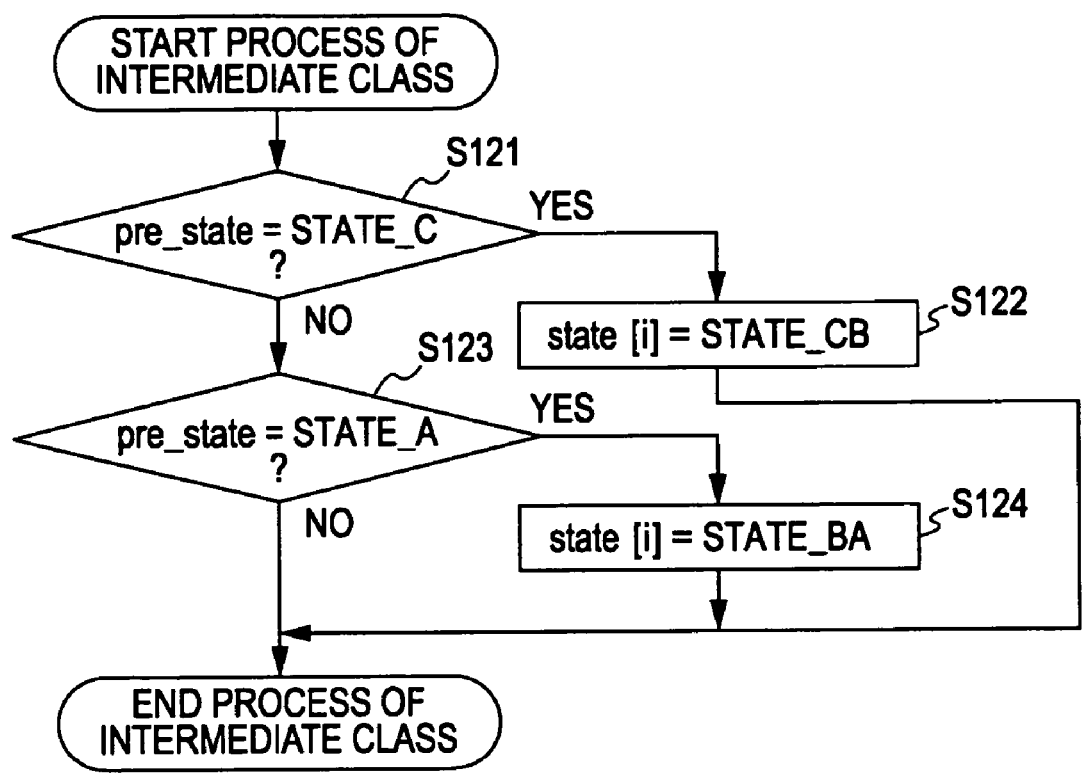
FIG. 15 is a flowchart illustrating an image processing operation according to the image processing method.

FIG. 15 is a flowchart showing an example of the process of the intermediate class performed in step S91. In the process of the intermediate class, the previous state transition value pre_state is obtained, and it is determined whether the previous state transition value pre_state is STATE_C (step S121).

If it is determined in step S121 that the previous state transition value pre_state is STATE_C, the process proceeds to step S122, where the state transition value state[i] is updated to STATE_CB, which indicates that the class has changed from the unstable class to the intermediate class.

If it is determined in step S121 that the previous state transition value pre_state is not STATE_C, the process proceeds to step S123, where it is determined whether the previous state transition value pre_state is STATE_A. If it is determined in step S123 that the previous state transition value pre_state is STATE_A, the process proceeds to step S124, where the state transition value state[i] is updated to STATE_BA, which indicates that the class has changed from the stable class to the intermediate class.

After step S122 or S124, the process of the intermediate class completes and the process returns to that of the flowchart shown in FIG. 13.

Figure 16:
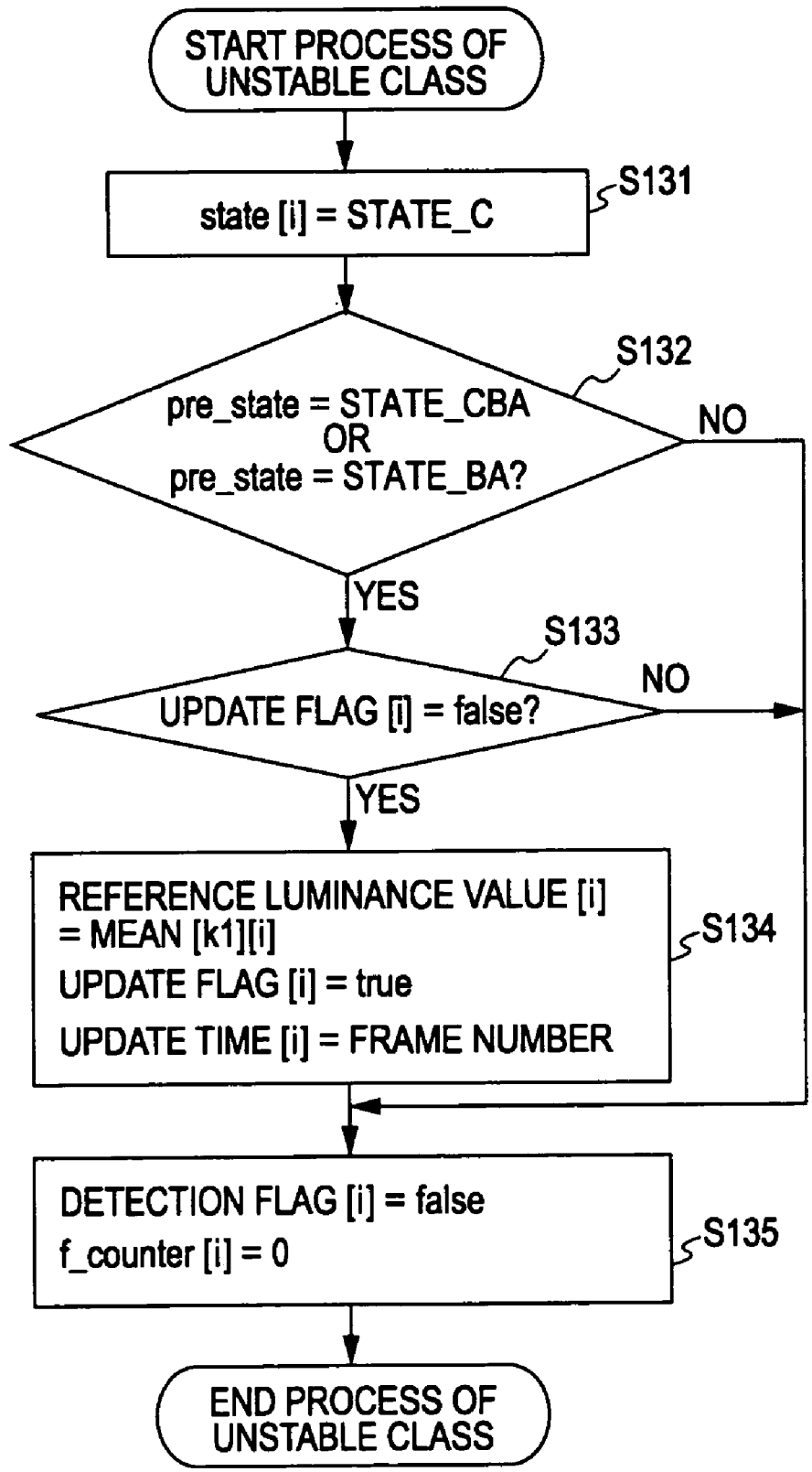
FIG. 16 is a flowchart illustrating an image processing operation according to the image processing method.
Figures 18A, 18B:
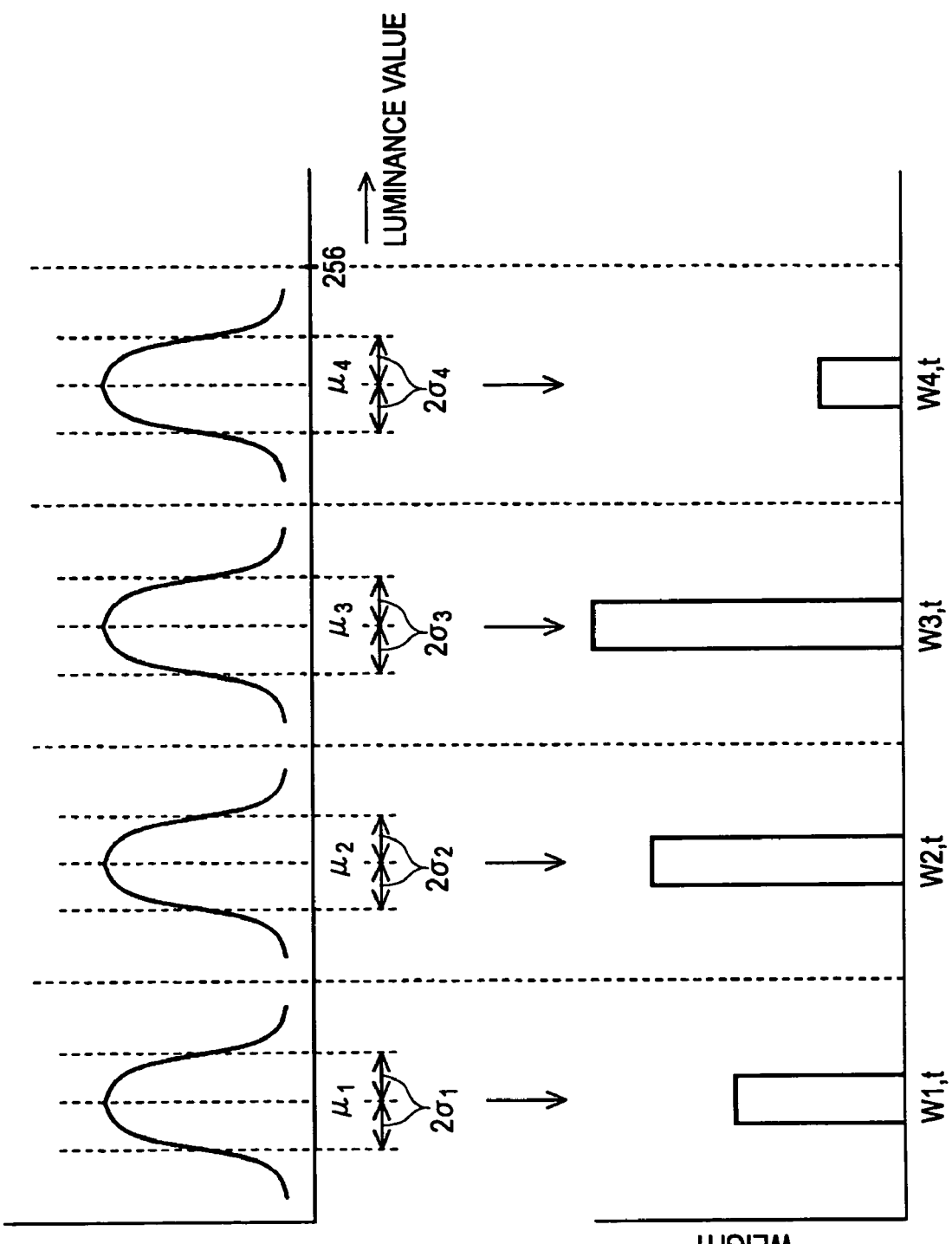
FIGS. 18A and 18B are used to describe the weighted mixture of normal distributions used in the image processing method.

FIG. 16 is a flowchart showing an example of the process of the unstable class performed in step S92 shown in FIG. 13. In the process of the unstable class, the state transition value state[i] is updated to STATE_C (step S131).

Then, the previous state transition value pre_state is obtained, and it is determined whether the previous state transition value pre_state is STATE_CBA or STATE_BA (step S132).

If it is determined in step S132 that the previous state transition value pre_state is STATE_CBA or STATE_BA, whether the reference luminance value [i] should be updated is determined. Specifically, whether the update flag is "false" is determined (step S133). If it is determined in step S133 that the update flag is "false", the reference luminance value [i] can be updated. Thus, the reference luminance value [i] is updated to the mean value of the luminance normal distribution corresponding to the maximum weight k1, that is, mean [k1] [i]. After the update, the update flag is changed to "true". Also, the frame number is stored as an update time [i] (step S134).

If it is determined in step S132 that the previous state transition value pre_state is not STATE_CBA or STATE_BA, the process proceeds to step S135. Also, the process proceeds to step S135 if the update flag is "true" in step S133 or after step S134. In step S135, the detection flag is set to "false", and the duration count value f_counter[i] to measure the duration of the state transition value STATE_CBA is initialized to 0.

After step S135, the process of the unstable class completes and the process returns to that of the flowchart shown in FIG. 13.

Referring back to FIG. 12, after the above-described detection in units of pixels has been done, the image processing unit 13 performs blocking on the basis of the detection flag in order to organize areas detected in units of pixels (step S72).

In the blocking, a range of 4 pixels wide by 4 pixels high is regarded as one block. If half or more of the pixels in the block has been detected, it is determined that all of the pixels in the block have been detected as an unmoving object. Conversely, if less than half of the pixels in the block has been detected, it is determined that the entire block is not detected as an unmoving object.

The block range may be shifted one pixel by one or may be shifted by skipping four pixels.

Then, labeling is performed on the blocked detected areas (step S73), and label data including the area of each detection area and the position of each circumscribed square is obtained (step S74).

Then, on the basis of the label data obtained in step S74, a detected area in which the area, the position of the circumscribed square, or the size is less than or more than a predetermined threshold is removed as noise (step S75).

If areas are detected with time difference, those areas should be detected as different unmoving objects even if the areas are adjacent to each other. Thus, labeling is performed on the remained detected areas in a time direction on the basis of detection times (step S76). For example, the same labels are attached to areas if the time difference between the areas is within one minute.

Then, the same ID number (identification number) is assigned to the same detected object so that the relationship between frames becomes clear (step S77). Then, an alarm is output for an unmoving object that has stayed over a predetermined stay period, together with data including the position, detection time, and stay time (step S78). Accordingly, the process of detecting an unmoving object completes.

Referring back to FIG. 7, after detection of an unmoving object has been done, whether an end signal has been output is determined (step S7). If an end signal has not been output, the process returns to step S10, where the reference image to correct displacement is updated. Then, a next input image is waited for and the subsequent steps are repeated. If it is determined in step S7 that an end signal has been output, the process completes.

Another Embodiment

In the above-described embodiment, one reference luminance value is used. According to another method for detecting an unmoving object, two types of reference luminance values may be used.

In an actual process, an object that was once detected may be detected again due to a change of weather during a long time of unmoving object detection. If labeling is performed in a time direction and if areas are detected with a time difference, one object may be fragmented because the areas detected with a time difference are separated even if they are adjacent to each other.

In order to prevent such a state, when a change in luminance of a pixel is to be detected in the above-described process of the stable class in detection in units of pixels, two reference luminance values are used in comparison: a reference luminance value Y1 that is generated in accordance with the update flag; and a reference luminance value Y2. For example, the reference luminance value Y2 is a mean value of a distribution of the maximum weight in the unstable class regardless of the update flag.

For example, assume the following case: a car stops on a road, and after a while, the luminance of the car changes. More specifically, the luminance of the car on which sunlight reflects changes due to a shadow.

In this case, the luminance of the road is I_road, the luminance of the car before change is I_car1, and the luminance of the car after change is I_car2. If a process is performed by using I_road as a reference luminance value, stop of the car is detected on the basis of the difference between I_road and I_car1, and then a change is detected again on the basis of the difference between I_road and I_car2, so that the detection time is updated. In that case, the detected object is divided into two blocks when labeling is performed in a time direction.

In order to prevent such inconvenience, I_car1 is set as the reference luminance value Y2, the difference between I_car1 and I_car2 is calculated, and the detection time is not updated if no difference exists therebetween. That is, during detection of change in luminance of a pixel, if the luminance is different from the reference luminance value Y1 but is the same as the reference luminance value Y2, the detection time is not updated so that the detected object is not fragmented.

According to the above-described embodiment, states of luminance are classified into a plurality of classes on the basis of the relationship between upper two weights of a mixture of normal distributions, and a class transition state is determined. Accordingly, an unmoving object that stably stays for a long time can be detected from an image including a moving object due to the following factors.

(1) Even if a moving object passes the front of an unmoving object to be detected and the unmoving object is not seen from a camera instantaneously, that does not affect the detection.

(2) Influence of shaking of trees or ruffle on a water surface can be alleviated.

(3) The reference luminance value can be updated for each pixel at an appropriate timing.

(4) The detecting method is adaptable to a slow change of environment.

(5) Detection of an unmoving object can be performed for a long time without using a large amount of past image data.

Modifications

In the above-described embodiments, a weighted mixture of normal distributions is used in detection, and thus all of the luminance distributions are normal distributions. However, the present invention can be applied to any method of updating the weight of each distribution in the above-described way even if the luminance distribution is not a normal distribution. Also, in the above-described embodiments, each distribution is a normal distribution and thus the representative luminance value of each distribution is a mean value. However, the representative luminance value may be a value according to the distribution.

In the above-described embodiments, an unmoving object is detected on the basis of a luminance value of each pixel. Alternatively, the detection may be performed on the basis of a luminance value of each block composed of a plurality of pixels, for example, a block of 2 pixels wide by 2 pixels high (four pixels in total). In that case, the mean value of the four pixels is used as a luminance value of the block.

In the above-described embodiments, classification is performed on the basis of the relationship between upper two weights, e.g., the ratio between the upper two weights. However, the present invention is not limited to this method. For example, classification may be performed on the basis of a change of the upper two weights and the maximum weight. That is, the vicinity of a change point of the upper two weights may be the unstable class, a state where the maximum weight is large may be the stable class, and an intermediate state between the unstable class and the stable class may be the intermediate class.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
image capturing means for capturing temporally sequential images;
calculating means for calculating weights of a plurality of luminance distributions by determining, in units of one or a plurality of pixels of the image captured by the image capturing means, whether the luminance of the one or the plurality of pixels belongs to any of the plurality of luminance distributions and by gradually increasing the weight of the luminance distribution to which the luminance belongs and gradually decreasing the weights of the other luminance distributions;
classifying means for classifying a temporal change state of the luminance of the one or the plurality of pixels into a plurality of classes on the basis of the weights of the luminance distributions calculated by the calculating means, the plurality of classes including at least a stable class in which the luminance of the one or the plurality of pixels is stable within a predetermined range, an unstable class in which the luminance distribution to which the luminance of the one or the plurality of pixels belongs is difficult to be determined, and an intermediate class between the stable class and the unstable class;
class transition determining means for determining temporal transition of the luminance change state classified by the classifying means in units of the one or the plurality of pixels;
reference luminance value updating means for updating a reference luminance value of the one or the plurality of pixels in accordance with elapse of time by obtaining a representative luminance value of the luminance distribution having the largest weight when a temporal change state of the luminance of the one or the plurality of pixels belongs to the stable class;
change-of-luminance detecting means for detecting whether the luminance of the one or the plurality of pixels has changed by comparing the reference luminance value with a representative luminance value of the luminance distribution having the largest weight among the plurality of luminance distributions at a change-of-luminance detection timing, the change-of-luminance detection timing being a time point when the class changes to the stable class from the unstable class through the intermediate class in the temporal transition determined by the class transition determining means; and
detected change storing means for storing information to identify a position of the one or the plurality of pixels in the image where a change has occurred and information about the time when the change occurred when the change-of-luminance detecting means detects a change of the luminance,
wherein an image portion that has appeared in the image and stopped there or that has disappeared from the image with elapse of time is detected on the basis of the information stored in the detected change storing means.

2. The image processing apparatus according to claim 1, wherein the calculating means calculates a weighted mixture of normal distributions including a plurality of normal distributions about luminance and the weights in units of the one or the plurality of pixels, and
wherein the representative luminance value is a mean luminance value of the normal distribution.

3. The image processing apparatus according to claim 1, wherein the classifying means performs classification into the plurality of classes on the basis of a relationship between upper two weights among the weights of the plurality of distributions.

4. The image processing apparatus according to claim 3, wherein the relationship between the upper two weights is a ratio between the upper two weights.

5. The image processing apparatus according to claim 1, wherein the reference luminance value updating means updates the reference luminance value when the class transition determining means determines that the class of a temporal change state of the luminance has changed to the unstable class from the stable class through the intermediate class.

6. The image processing apparatus according to claim 1, wherein update of the reference luminance value is prohibited for a predetermined time period since a change in the luminance is detected at the change-of-luminance detection timing.

7. An image processing device for implementing a method of processing images, comprising
capturing temporally sequential images at the image processing device;
calculating weights of a plurality of luminance distributions by determining, in units of one or a plurality of pixels of images captured, whether the luminance of the one or the plurality of pixels belongs to any of the plurality of luminance distributions and by gradually increasing the weight of the luminance distribution to which the luminance belongs and gradually decreasing the weights of the other luminance distributions;
classifying a temporal change state of the luminance of the one or the plurality of pixels into a plurality of classes on the basis of the weights of the luminance distributions calculated, the plurality of classes including at least a stable class in which the luminance of the one or the plurality of pixels is stable within a predetermined range, an unstable class in which the luminance distribution to which the luminance of the one or the plurality of pixels belongs is difficult to be determined, and an intermediate class between the stable class and the unstable class;
determining temporal transition of the luminance change state classified in units of the one or the plurality of pixels;
updating a reference luminance value of the one or the plurality of pixels in accordance with elapse of time by obtaining a representative luminance value of the luminance distribution having the largest weight when a temporal change state of the luminance of the one or the plurality of pixels belongs to the stable class;
detecting whether the luminance of the one or the plurality of pixels has changed by comparing the reference luminance value with a representative luminance value of the luminance distribution having the largest weight among the plurality of luminance distributions at a change-of-luminance detection timing, the change-of-luminance detection timing being a time point when the class changes to the stable class from the unstable class through the intermediate class in the temporal transition determined in the class transition determining step; and
storing at the image processing device, information to identify a position of the one or the plurality of pixels in the image where a change has occurred and information about the time when the change occurred when the change-of-luminance detecting detects a change of the luminance,
wherein an image portion that has appeared in the image and stopped there or that has disappeared from the image with elapse of time is detected at the image processing device on the basis of the information stored in the detected change storing.

8. A computer readable storage medium encoded with computer program instructions accessible by a computer for execution, and upon execution, transform the computer into a specially programmed device for implementing a method of image processing, comprising:
capturing temporally sequential images;
calculating weights of a plurality of luminance distributions by determining, in units of one or a plurality of pixels of the images captured, whether the luminance of the one or the plurality of pixels belongs to any of the plurality of luminance distributions and by gradually increasing the weight of the luminance distribution to which the luminance belongs and gradually decreasing the weights of the other luminance distributions;
classifying a temporal change state of the luminance of the one or the plurality of pixels into a plurality of classes on the basis of the weights of the luminance distributions calculated, the plurality of classes including at least a stable class in which the luminance of the one or the plurality of pixels is stable within a predetermined range, an unstable class in which the luminance distribution to which the luminance of the one or the plurality of pixels belongs is difficult to be determined, and an intermediate class between the stable class and the unstable class;
determining temporal transition of the luminance change state classified by the classifying means in units of the one or the plurality of pixels;
updating a reference luminance value of the one or the plurality of pixels in accordance with elapse of time by obtaining a representative luminance value of the luminance distribution having the largest weight when a temporal change state of the luminance of the one or the plurality of pixels belongs to the stable class;
detecting whether the luminance of the one or the plurality of pixels has changed by comparing the reference luminance value with a representative luminance value of the luminance distribution having the largest weight among the plurality of luminance distributions at a change-of-luminance detection timing, the change-of-luminance detection timing being a time point when the class changes to the stable class from the unstable class through the intermediate class in the temporal transition;
storing information to identify a position of the one or the plurality of pixels in the image where a change has occurred and information about the time when the change occurred when the change-of-luminance detects a change of the luminance; and
outputting a detection result of an image portion that has appeared in the image and stopped there or that has disappeared from the image with elapse of time on the basis of the information stored in the detected change storing,
so as to detect an image portion that has appeared in the image and stopped there or that has disappeared from the image with elapse of time.

9. An image processing apparatus comprising:
an image capturing unit configured to capture temporally sequential images;
a calculating unit configured to calculate weights of a plurality of luminance distributions by determining, in units of one or a plurality of pixels of the image captured by the image capturing unit, whether the luminance of the one or the plurality of pixels belongs to any of the plurality of luminance distributions and by gradually increasing the weight of the luminance distribution to which the luminance belongs and gradually decreasing the weights of the other luminance distributions;

a classifying unit configured to classify a temporal change state of the luminance of the one or the plurality of pixels into a plurality of classes on the basis of the weights of the luminance distributions calculated by the calculating unit, the plurality of classes including at least a stable class in which the luminance of the one or the plurality of pixels is stable within a predetermined range, an unstable class in which the luminance distribution to which the luminance of the one or the plurality of pixels belongs is difficult to be determined, and an intermediate class between the stable class and the unstable class;

a class transition determining unit configured to determine temporal transition of the luminance change state classified by the classifying unit in units of the one or the plurality of pixels;

a reference luminance value updating unit configured to update a reference luminance value of the one or the plurality of pixels in accordance with elapse of time by obtaining a representative luminance value of the luminance distribution having the largest weight when a temporal change state of the luminance of the one or the plurality of pixels belongs to the stable class;

a change-of-luminance detecting unit configured to detect whether the luminance of the one or the plurality of pixels has changed by comparing the reference luminance value with a representative luminance value of the luminance distribution having the largest weight among the plurality of luminance distributions at a change-of-luminance detection timing, the change-of-luminance detection timing being a time point when the class changes to the stable class from the unstable class through the intermediate class in the temporal transition determined by the class transition determining unit; and a detected change storing unit configured to store information to identify a position of the one or the plurality of pixels in the image where a change has occurred and information about the time when the change occurred when the change-of-luminance detecting unit detects a change of the luminance, wherein an image portion that has appeared in the image and stopped there or that has disappeared from the image with elapse of time is detected on the basis of the information stored in the detected change storing unit.

* * * * *